US009889939B2

(12) United States Patent
Zhang et al.

(10) Patent No.: US 9,889,939 B2
(45) Date of Patent: Feb. 13, 2018

(54) ENVIRONMENTAL CONTROL SYSTEM AND METHODS OF OPERATING SAME

(75) Inventors: Wei Zhang, Bellevue, WA (US); David R. Space, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 634 days.

(21) Appl. No.: 13/490,270

(22) Filed: Jun. 6, 2012

(65) Prior Publication Data

US 2013/0327891 A1    Dec. 12, 2013

(51) Int. Cl.
*B64D 13/08* (2006.01)
*B64D 13/06* (2006.01)

(52) U.S. Cl.
CPC ...... *B64D 13/08* (2013.01); *B64D 2013/0688* (2013.01); *Y02T 50/56* (2013.01)

(58) Field of Classification Search
USPC .............................................. 244/118.5, 119
See application file for complete search history.

(56) References Cited

U.S. PATENT DOCUMENTS

| | | | | |
|---|---|---|---|---|
| 4,742,760 A * | 5/1988 | Horstman | .............. | B64D 13/00 244/118.5 |
| 5,545,084 A * | 8/1996 | Fischer | .................. | B64D 13/08 454/76 |
| 5,897,079 A * | 4/1999 | Specht | .................... | B64C 1/067 244/118.5 |
| 7,789,346 B2 * | 9/2010 | Horstman | .............. | B64D 13/06 244/118.5 |
| 7,871,038 B2 | 1/2011 | Space et al. | | |
| 8,393,573 B2 * | 3/2013 | Horstman | .............. | B64D 13/06 244/118.5 |

(Continued)

FOREIGN PATENT DOCUMENTS

| | | |
|---|---|---|
| JP | H08228945 | 2/1996 |
| JP | 2011500411 A | 1/2011 |

OTHER PUBLICATIONS

Zhang et al., "Experimental study of various air distribution systems on commercial airplanes," 2011, Proceedings of 12th International Conference on Indoor Air Quality and Climates (Indoor Air 2011), Austin, Texas, USA.

(Continued)

*Primary Examiner* — Brian M O'Hara
*Assistant Examiner* — Keith L Dixon
(74) *Attorney, Agent, or Firm* — Armstrong Teasdale LLP

(57) ABSTRACT

An environmental control system includes an air supply system coupled to an aircraft. The air supply system includes an external air supply device coupled to the aircraft and a supply duct coupled in flow communication to the external air supply device. An air supply outlet is coupled in flow communication to the supply duct and in flow communication with an occupancy zone and/or a floor distribution section. An air recirculation system is coupled to the floor distribution section. The air recirculation system includes a recirculation supply device coupled to the aircraft and a recirculation duct coupled in flow communication to the recirculated supply device and coupled to the floor distribution section. A recirculation outlet is coupled in flow communication to the recirculation duct and in flow communication with the recirculation zone and/or the floor distribution section.

24 Claims, 16 Drawing Sheets

(56) References Cited

U.S. PATENT DOCUMENTS

2010/0279595 A1* 11/2010 Horstman .............. B64D 13/06
454/76
2011/0240795 A1 10/2011 Brugger et al.

OTHER PUBLICATIONS

Loomans, "Measurements at and simulations of the (improved) desk displacement ventilation concept," International Conference on Air Distribution in Rooms (Roomvent '98), Jun. 14-17, 1998, Stockholm, Sweden, pp. 241-248.

Stefano, S., K. H. Lee, F. Bauman, and T. Webster, 2010. Simplified calculation method for design cooling loads in underfloor air distribution (UFAD) systems. Energy and Buildings vol. 43, Issue 2-3, pp. 517-528.

Schiavon S, Bauman F, Tully B, and Rimmer J. 2012. Room air stratification in combined chilled ceiling and displacement ventilation systems. HVAC&R Research, vol. 18 (1).

Emmerich, S.J. and T. McDowell. 2005. "Initial evaluation of displacement ventilation and dedicated outdoor air systems for U.S. commercial buildings." Final Report by the National Institute of Standards and Technology (NIST) prepared for the U.S. Environmental Protection Agency (EPA). http://tinyurl.com/22h8tv (or http://www.fire.nist.gov/bfrlpubs/build05/PDF/b05011.pdf).

Bauman et al., "Cooling airflow design calculations for UFAD," American Society of Heating, Refrigerating and Air-Conditioning Engineers, Inc. (www.ashrae.org). Published in ASHRAE Journal, vol. 49, Oct. 2007.

Schiavon, S., K. H. Lee, F. Bauman, and T. Webster, Jan. 2010. "Influence of raised floor on zone design cooling load in commercial buildings," Energy and Buildings.

Schiavon S., F. Bauman, K. H. Lee, and T. Webster, 2010. "Development of a simplified cooling load design tool for underfloor air distribution systems," Final Report to CEC PIER Program, pp. 20. CEC Contract No. 500-06-049.

Livchak, A. and Nall, D. (2001), Displacement Ventilation—Application for Hot and Humid Climate, Clima 2000/Napoli 2001 World Congress—Napoli (I), Sep. 15-18, 2001.

Nielsen, P.V., "Displacement Ventilation," Aalborg University pvn@civil.auc.dk.

Schiavon, S., F. Bauman, B. Tully, and J. Rimmer, 2011. Air Change Effectiveness in Laboratory Tests of Combined Chilled Ceiling and Displacement Ventilation Systems. Proceedings of Indoor Air 2011. Austin, TX, Jun. 5-10.

Szaday, "Validation of Computer Fluid Dynamic Simulation for Displacement Ventilation," Proceedings 16th European Simulation Symposium, SCS Press, 2004 (www.scs-europe.net/services/ess2004/pdf/meth-52.pdf).

Rees, S., P. Haves. 1999. "A nodal model for displacement ventilation and chilled ceiling systems in office spaces". Proceedings of Building Simulation '99, 433-440.

Cho et al., "Literature review of displacement ventilation," ESL-TR 05/05-01, May 2005, Energy Systems Laboratory, Texas Engineering Experiment Station, Texas A&M University.

Notice of Reasons for Rejection, Japanese Patent Application No. 2013-118-133, dated Mar. 28, 2017, 5 pages.

* cited by examiner

ENVIRONMENTAL CONTROL SYSTEM AND METHODS OF OPERATING SAME

BACKGROUND OF THE INVENTION

The present disclosure relates to an environmental control system, and more specifically, to methods and systems for providing external air and recirculated air to an aircraft.

Traditionally, pressurized aircraft use Environmental Control Systems ("ECS") to maintain cabin pressurization and to control cabin temperatures during flight. Due to high occupant density in an aircraft cabin, a common approach for an ECS is to flow external air from the engines to pressurize the cabin. This air supply is known as 'bleed air'. Some known systems use this ducted bleed air, cool the bleed air using air conditioning packs and then mix the bleed air with recirculated cabin air flow for resupply into the cabin and the flight deck during flight condition. On the ground, aircraft typically operate a smaller compressor known as an auxiliary power unit to bleed external air for pressurizing cabin air. In some known aircraft, the recirculated air flow may provide about 50% of total air flow and the external bleed air may provide about 50% of total air flow.

More particularly, in order to maintain cabin pressurization and temperature in some known aircraft, external air is supplied to the cabin via air conditioning packs and a portion of the air in the cabin is recirculated by recirculation fans to provide an acceptable level of volumetric airflow to the aircraft passengers. In many cases, recirculation fans run at a constant speed and the total volumetric airflow to the cabin can be maintained constant by modulating the flow provided by the air conditioning packs. In some cases, air recirculation is passed through a filter to improve cabin air quality. In other cases, aircraft include cabin humidifiers and/or dehumidifiers to further condition the cabin air.

In recent years, due to increased passengers travelling by air annually worldwide, there are increased concerns, regulations and needs regarding the improvement of cabin air quality and fuel saving for commercial air travel. As the amount of external air provided by the ECS increases, aircraft fuel efficiency is reduced, and in particular when the ECS uses bleed air from the aircraft engines. Accordingly, it can be desirable to reduce the amount of external air flowing into the cabin while meeting governmental regulations that may require a minimum flow rate per occupant during flight. Moreover, an ECS that improves airflow and air quality in the cabin; reduces CO2 and other pollutants in the cabin; reduces thermal loading of the aircraft; reduces external air input and increases fuel savings is desired.

BRIEF DESCRIPTION OF THE INVENTION

In one aspect, an aircraft is provided. The aircraft includes a fuselage having an occupancy zone, a recirculation zone and a floor distribution section that is coupled in flow communication to the occupancy zone and the recirculation zone. The aircraft includes an air supply device coupled to the fuselage; a supply duct coupled in flow communication to the external air supply device; and an air supply outlet coupled in flow communication to the supply duct and in flow communication with at least one of the occupancy zone and the floor distribution section. The aircraft further includes an air recirculation system coupled to the floor distribution section. The air recirculation system includes a recirculation supply device coupled to the fuselage; a recirculation duct coupled in flow communication to the recirculated supply device and coupled to the floor distribution section; and a recirculation outlet coupled in flow communication to the recirculation duct and in flow communication with at least one of the recirculation zone and the floor distribution section.

In another aspect, an environmental control system for use with an aircraft is provided, wherein the aircraft includes a floor distribution section that is coupled in flow communication to an occupancy zone and a recirculation zone. The environmental control system includes an air supply system having an air supply device coupled to the aircraft and a supply duct coupled in flow communication to the air supply device. The air supply system further includes an air supply outlet coupled in flow communication to the supply duct and in flow communication with at least one of the occupancy zone and the floor distribution section. The environmental control system includes an air recirculation system that is coupled to the aircraft. The air recirculation system includes a recirculation supply device coupled to the aircraft and recirculation duct coupled in flow communication to the recirculation supply device and coupled to the floor distribution section. The air recirculation system further includes a recirculation outlet coupled in flow communication to the recirculation duct and in flow communication with at least one of the recirculation zone and the floor distribution section.

In another aspect, a method of controlling airflow within an aircraft having a floor distribution section that is coupled in fluid communication to an occupancy zone, a recirculation and a mixing zone is provided. The method includes directing external air into an air supply system and directing recirculated air into an air recirculation system. The method further includes channeling the external air into the occupancy zone and channeling the recirculated air into the recirculation zone. The external air and the recirculated air are mixed in the mixing zone to facilitate forming a mixed air. The method includes channeling the mixed air into the air recirculation system.

DETAILED DESCRIPTION OF THE INVENTION

The embodiments described herein relate to environmental systems and methods of operating the systems. More particularly, the embodiments relate to a system for supplying external air and recirculated air into an occupancy zone, a recirculation zone and a mixing zone of a structure. Moreover, the embodiments are utilized in a variety of environments such as, but not limited to, military, civil, industrial, rail, shipping, aerodynamic and consumer environments. The embodiments described herein facilitate improving air quality within the structure and fuel efficiency of the structure. In the exemplary embodiment, structure includes a vehicle such as, but not limited, to an aircraft, a spacecraft, a launch vehicle, seaborne or undersea vessel and/or ground based vehicle. Alternatively, structure can include buildings and residences. It should be understood that the embodiments described herein are not limited to vehicles, and further understood that the descriptions and figures that utilize an aircraft vehicle are exemplary only and the embodiments described herein are compatible with existing aircraft and/or new aircraft while providing an environmental control system that is safe, efficient and convenient to use.

Figure 1:
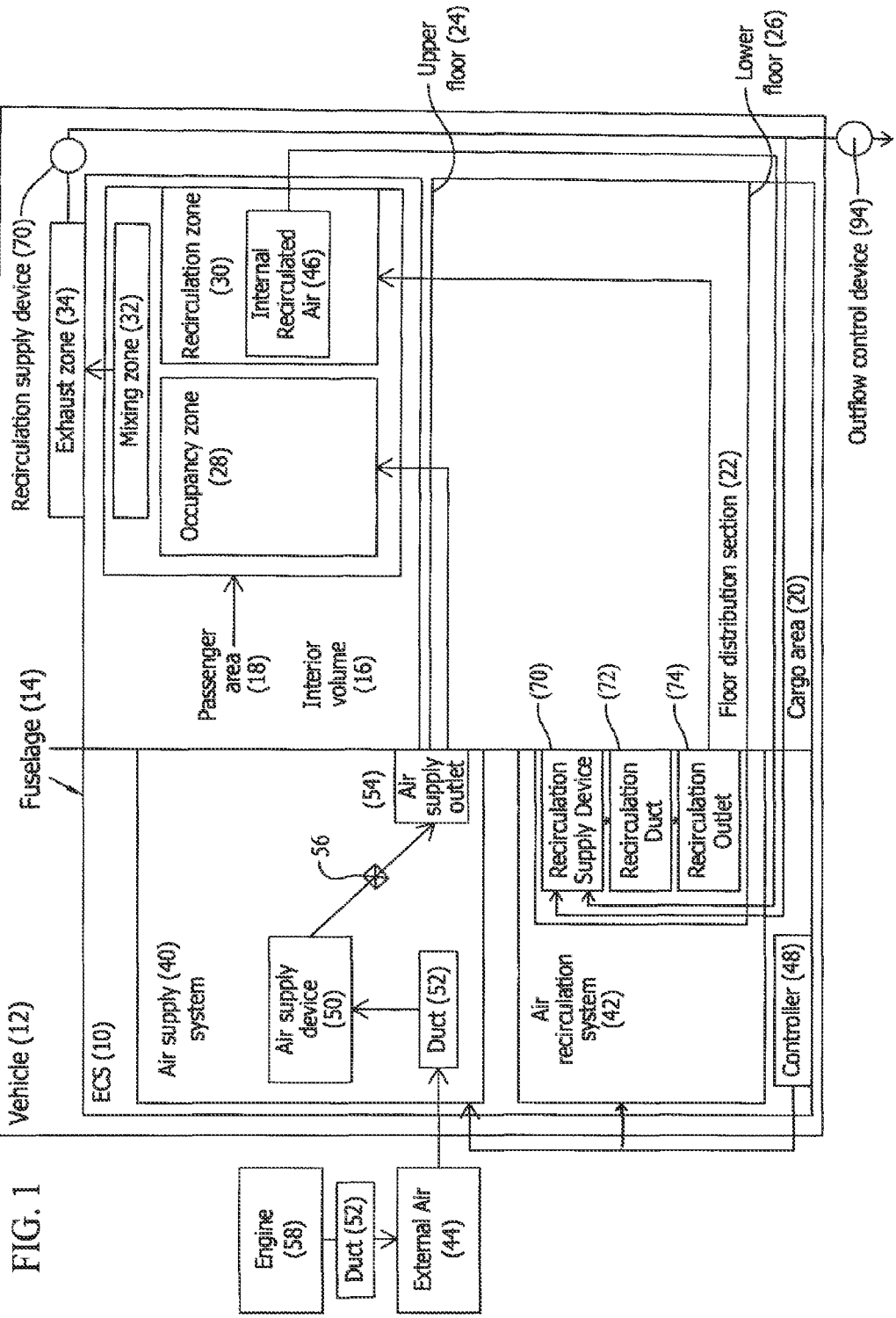
FIG. 1 illustrates a schematic diagram of an exemplary environmental control system that may be used with an aircraft.

FIG. 1 illustrates a schematic diagram of an exemplary environmental control system 10 that may be used to control airflow within an aircraft 12. Aircraft 12 includes a fuselage 14 having an interior volume 16. Moreover, fuselage 14 includes a passenger area 18, a cargo area 20 and an under floor distribution section 22 positioned between passenger area 18 and cargo area 20. In the exemplary embodiment, an upper floor 24 and a lower floor 26 define a location for floor distribution section 22. Passenger area 18 includes an occupancy zone 28, a recirculation zone 30, a mixing zone 32 and an exhaust zone 34. In the exemplary embodiment, occupancy zone 28 requires a higher air quality level than recirculation zone 30. In a preferred embodiment, occupancy zone 28 may include locations for seating passengers (not shown). In an exemplary embodiment, recirculation zone 30 may include an aisle (not shown) or other volume where passengers are not seated. In the exemplary embodiment, mixing zone 32 is adjacent to occupancy zone 28 and recirculation zone 30. Mixing zone 32 is configured to mix air that flows through the occupancy zone 28 and recirculation zone 30 prior to being exhausted from passenger area 18. Environmental control system 10 includes an air supply system 40 and an air recirculation system 42. Air supply system 40 is coupled in flow communication to passenger area 18 and is configured to supply external air mass 44 into interior volume 16. Air recirculation system 42 is coupled in flow communication to floor distribution section 22 and is configured to recirculate air mass 46 within interior volume 16.

Environmental control system 10 also includes a controller 48 operably coupled to air supply system 40 and air recirculation system 42. Controller 48 is configured to provide control signals to air supply system 40 and air recirculation system 42 to provide selected supply flow rates and selected recirculation flow rates to meet various airflow requirements at various locations inside aircraft 12. For example, controller 48 can control the supply flow rate and the recirculation flow rate to meet selected Federal Aviation Regulation (FAR) requirements, to meet cooling requirements, to meet occupant comfort requirements, to meet smoke and fume suppression requirements, and/or to minimize occupant exposure to various contaminants. Additionally, controller 48 can control the supply flow rates and the recirculation flow rates to meet selected airflow requirements in a manner that allows fuel efficient operation of aircraft 12.

Figure 2:
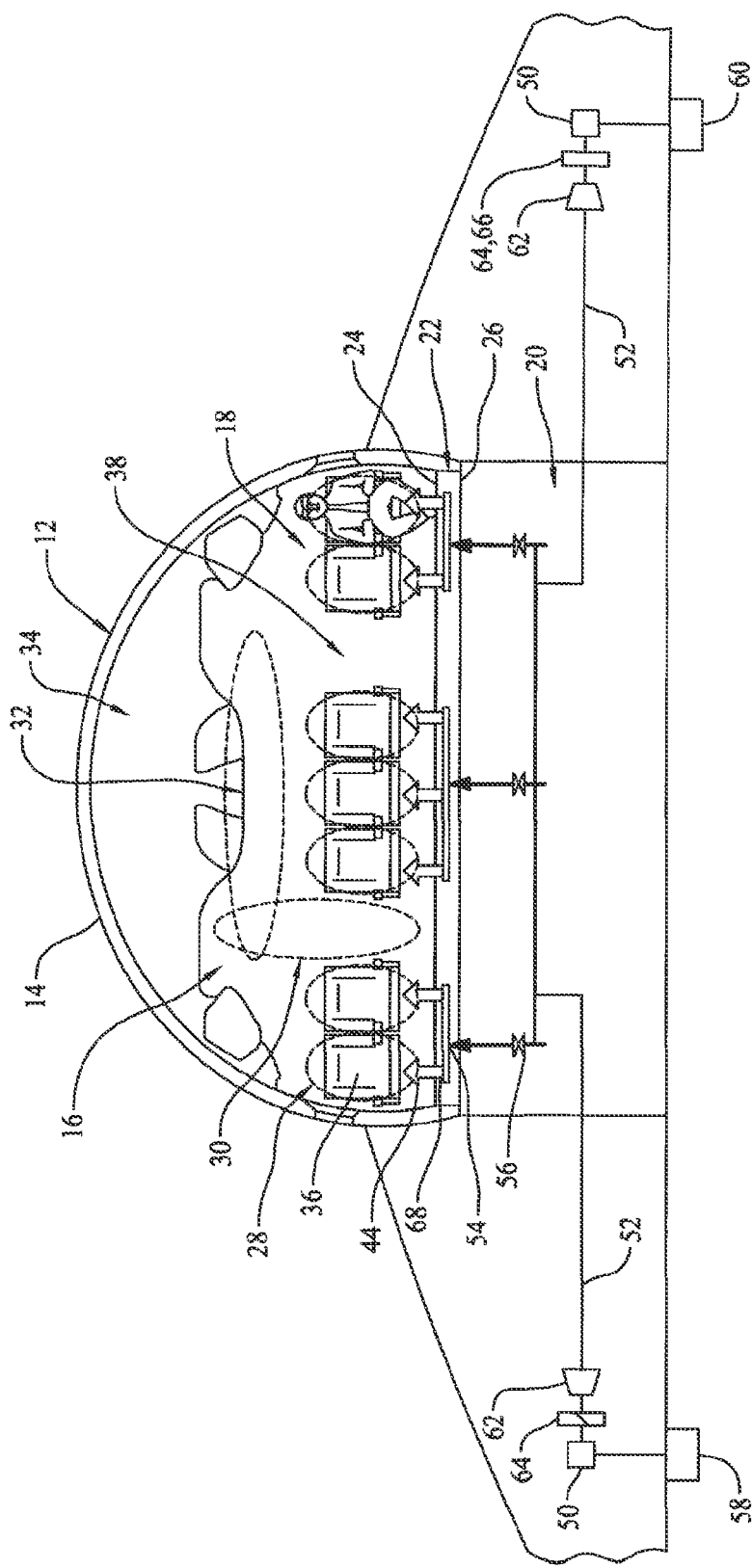
FIG. 2 illustrates a schematic diagram of the aircraft and an exemplary air supply system of the environmental control system shown in FIG. 1.

FIG. 2 illustrates a schematic diagram of aircraft 12 and air supply system 40 shown in FIG. 1. Air supply system 40 includes an air supply device 50, a supply duct 52, and an air supply outlet 54. Moreover, air supply system 40 includes a flow control device 56 such as, but not limited to, a valve coupled in flow communication to supply duct 52 and positioned in between air supply device 50 and air supply outlet 54. In the illustrated example, air supply system 40 is shown coupled to a first engine 58 and a second engine 60, for example a right engine and a left engine respectively. Air supply system 40 can be coupled to a single engine or more than two engines. Air supply system 40 also can be coupled to a compressor (not shown) to bleed air from fuselage 14 without flow communication with engines 58, 60.

External air supply device 50 is coupled in flow communication to passenger area 18. Air supply device 50 is configured to receive external air mass 44 from exterior of aircraft 12 and to provide at least a portion of external air mass 44 through supply duct 52 and air supply outlet 54 and into passenger area 18. External air supply device 50 can provide external air mass 44 to passenger area 18 at a variable supply flow rate (e.g., a variable volume flow rate or mass flow rate). External air mass 44 can include engine bleed air, for example air extracted from engines 58, 60 and in particular a compressor section (not shown) of engines 58, 60 associated with or carried by aircraft 12. In the exemplary embodiment, air supply system 40 may include a temperature control device 62 such as, but not limited to, an air conditioning pack to facilitate controlling the temperature of external air mass 44 provided to interior volume 16 of aircraft 12. Moreover, air supply system 40 may include a turbine (not shown) and/or a heat exchanger (not shown) that is configured to exchange the heat from bleed air (not shown) with ambient external air mass 44. Additionally, in the exemplary embodiment, air supply system 40 may include a filtration device 64 such as, but not limited to, an air purification pack that includes one or more filtration elements (not shown) for filtering contaminants (e.g., gaseous and/or particulate contaminants) from at least a portion of external air mass 44 passing through external air supply device 50. Moreover, air supply system 40 may include a VOC/O3 converter 66.

External air supply device 50 can include a moisture control device (not shown), which can add moisture to at least a portion of external air mass 44 passing though or proximate to external air supply device 50, remove moisture from at least a portion of air passing though or proximate to external air supply device 50, direct dry air to selected location of interior volume 16, and/or direct moist air to a selected location of interior volume 16.

Supply duct 52 may be coupled in flow communication to external air supply device 50. Supply duct 52 may be configured to channel external air mass 44 from external air supply device 50 and into interior volume 16. Supply duct 52 may include components such as, but not limited to, piping and/or channels. Alternatively, supply duct 52 may include any channeling device that can be used to enable environmental control system 10 to function as described herein. In the exemplary embodiment, supply duct 52 is disposed in at least within cargo area 20 and floor distribution section 22. Supply duct 52, however, can be disposed in any portion of fuselage 14 to enable environmental control system 10 to work as described herein.

In the exemplary embodiment, air supply outlet 54 is coupled in flow communication to supply duct 52 and coupled to upper floor 24. More particularly, air supply outlet 54 is coupled to upper floor 24 and in flow communication with passenger area 18. Air supply outlet 54 may include a diffuser 68 which is configured to discharge external air mass 44 from supply duct 52 and into at least one of occupancy zone 28, recirculation zone 30 and mixing zone 32. In the exemplary embodiment, air supply outlet 54 is coupled to upper floor 24 and in flow communication to occupancy zone 28. More particularly, air supply outlet 54 is coupled to upper floor 24 and near at least one seat 36 of a plurality of seats 36.

Air supply outlet 54 may be configured to discharge external air mass 44 into occupancy zone 28 and about and/or around seat 36. In the exemplary embodiment, air supply outlet 54 is coupled to upper floor 24 and in a position underneath seat 36. Alternatively, air supply outlet 54 can be coupled in flow communication to fuselage 14 in a position (not shown) near a side of seat 36 and/or on top of seat 36. Air supply outlet 54 can be positioned in any position and/or orientation to channel external air mass 44 from supply duct 52 and into occupancy zone 28. Moreover, air supply outlet 54 can be positioned to discharge external air mass 44 around more than one seat 36. Diffuser 68 of air supply outlet 54 can be coupled to controller 48 (shown in FIG. 1) which is configured to regulate flow of external air mass 44 out of diffuser 68 and into occupancy zone 28.

Figure 3:
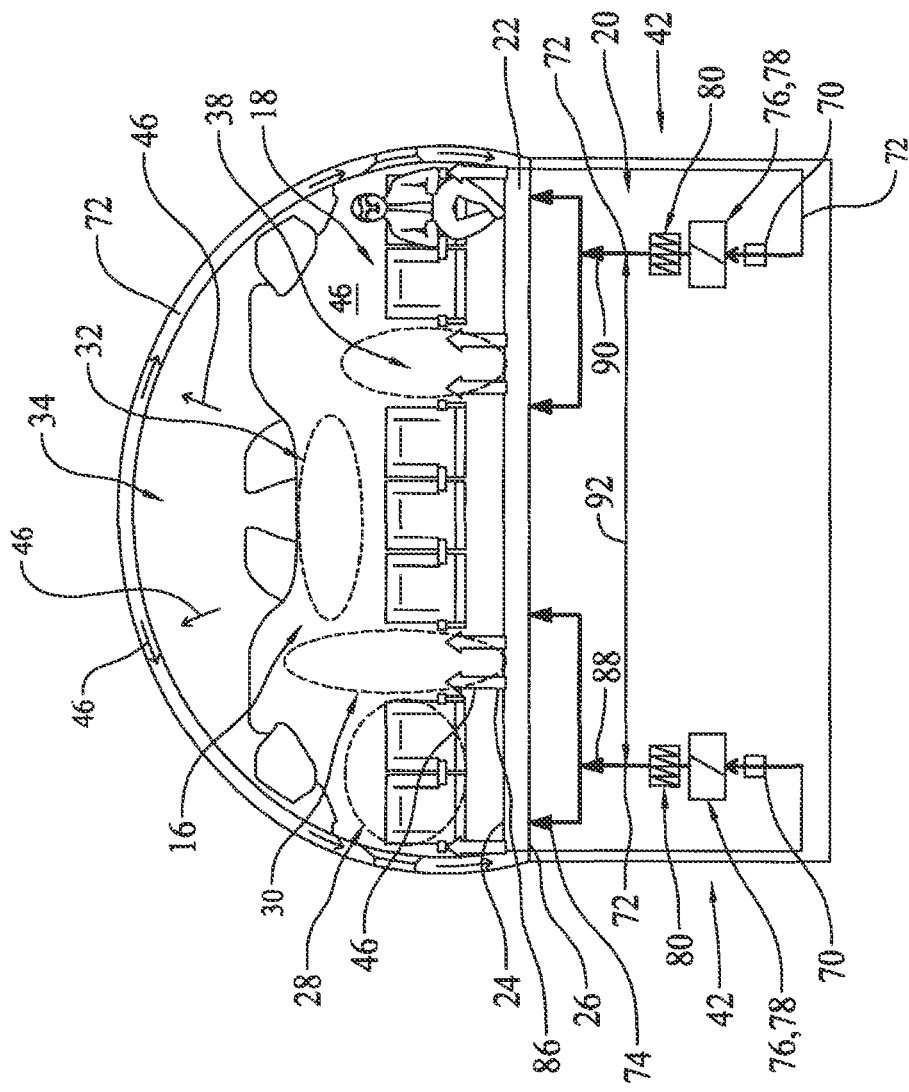
FIG. 3 illustrates a schematic diagram of the aircraft and an exemplary air recirculation system of the environmental control system shown in FIG. 1.

FIG. 3 illustrates a schematic diagram of aircraft 12 and air recirculation system 42. Air recirculation system 42 may include a recirculation supply device 70, a recirculation duct 72 and a recirculation outlet 74. Recirculation duct 72 is coupled in flow communication to recirculation supply device 70 and to recirculation outlet 74. Air recirculation system 42 may further include a filter 76 and an air purifier pack 78. Moreover, air recirculation system 42 may include a heat exchanger 80 coupled to recirculation duct 72 and positioned in between recirculation supply device 70 and recirculation outlet 74.

Recirculation supply device 70 may be coupled in flow communication to floor distribution section 22 via recirculation duct 72. Recirculation supply device 70 may be configured to provide recirculated air mass 46 to interior volume 16 at a variable supply flow rate (e.g., a variable volume flow rate or mass flow rate). In the exemplary embodiment, recirculation supply device 70 is configured to receive air 46 that is present in passenger area 18 and channel air 46 through exhaust zone 34 and into recirculation duct 72. Recirculation supply device 70 can include a variable speed recirculation fan (not shown) wherein the rotation speed of the recirculation fan can be varied to provide selected supply flow rates (e.g., flow rates proportional to and/or otherwise associated with the rotation speed of the recirculation fan). As used herein, recirculation supply device 70 can include any recirculation device having a rotating air propulsive element, for example, a bladed fan, a propeller, an impeller, and/or the like. In an embodiment, air recirculation system 42 may include recirculation supply device 70 coupled to recirculation duct 72 between exhaust zone 34 and cargo area 20 (shown in FIG. 1).

Recirculation duct 72 may be coupled in flow communication to recirculation supply device 70 and is coupled in flow communication to floor distribution section 22. Recirculation duct 72 may be configured to channel recirculated air mass 46 from recirculation supply device 70, into floor distribution section 22 and into interior volume 16. Recirculation duct 72 may include components such as, but not limited to, piping and/or channels. Alternatively, recirculation duct 72 can include any channeling device that can be used to enable environmental control system 10 to function as described herein. In the exemplary embodiment, recirculation duct 72 is disposed within at least one of cargo area 20 and exhaust zone 34. Alternatively, recirculation duct 72 can be disposed in any portion of fuselage 14 to enable environmental control system 10 to function as described herein.

Recirculation outlet 74 is coupled in flow communication to floor distribution section 22 which is in flow communication with passenger area 18. More particularly, recirculation outlet 74 includes a diffuser 86 which is configured to discharge air 46 from floor distribution section 22 and into at least one of occupancy zone 28, recirculation zone 30 and mixing zone 32. In the exemplary embodiment, diffuser 86 is coupled in flow communication to recirculation zone 30. More particularly, diffuser 86 is coupled to upper floor 24 and near at least one aisle 38 of the plurality of aisles 38. Diffuser 86 is configured to discharge recirculated air mass 46 into aisle 38 and recirculation zone 30. Alternatively, recirculation outlet 74 can be coupled to fuselage 14 in a position (not shown) near a side of aisle 38 and/or on top of aisle 38. Recirculation outlet 74 can be positioned in any position and/or orientation to channel recirculated air mass 46 from recirculation duct 72 and into recirculation zone 30. Diffuser 86 of recirculation outlet 74 can be coupled to controller 48 (shown in FIG. 1) which is configured to regulate flow of recirculated air mass 46 out of diffuser 86 and into recirculation zone 30.

In the exemplary embodiment, recirculation duct 72 includes a first recirculation duct 88 and a second recirculation duct 90. Air recirculation system 42 includes a control duct 92 coupled in flow communication to first recirculation supply duct 52 and in flow communication to second recirculation supply duct 52. Control duct 92 is configured to adjust and/or balance flow of recirculated air mass 46 through first recirculation duct 88 and second recirculation duct 90 and/or adjust temperature of recirculation air 46 flowing through first recirculation duct 88 and second recirculation duct 90.

Figure 4:
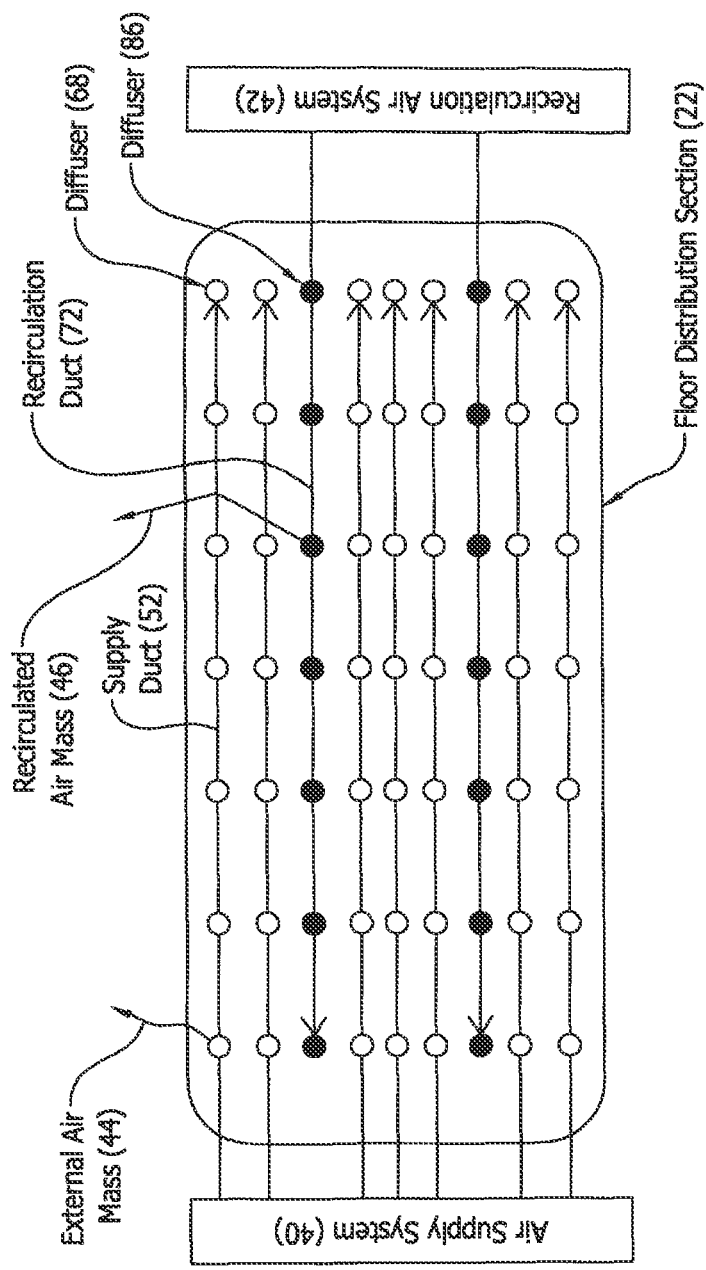
FIG. 4 illustrates a top view of a floor distribution section of the aircraft shown in FIG. 1.

FIG. 4 illustrates a top view of floor distribution section 22. A plurality of supply ducts 52 is coupled in flow communication to air supply system 40 and to a plurality of diffusers 68. Air supply system 40 is configured to channel external air mass 44 into supply ducts 52 and out of diffusers 68. A plurality of recirculation ducts 72 is coupled in flow communication to recirculation air system 42 and to a plurality of diffusers 86. Recirculation air system 42 is configured to channel recirculated air mass 46 into recirculation ducts 72 and out of diffusers 68.

Figure 5:
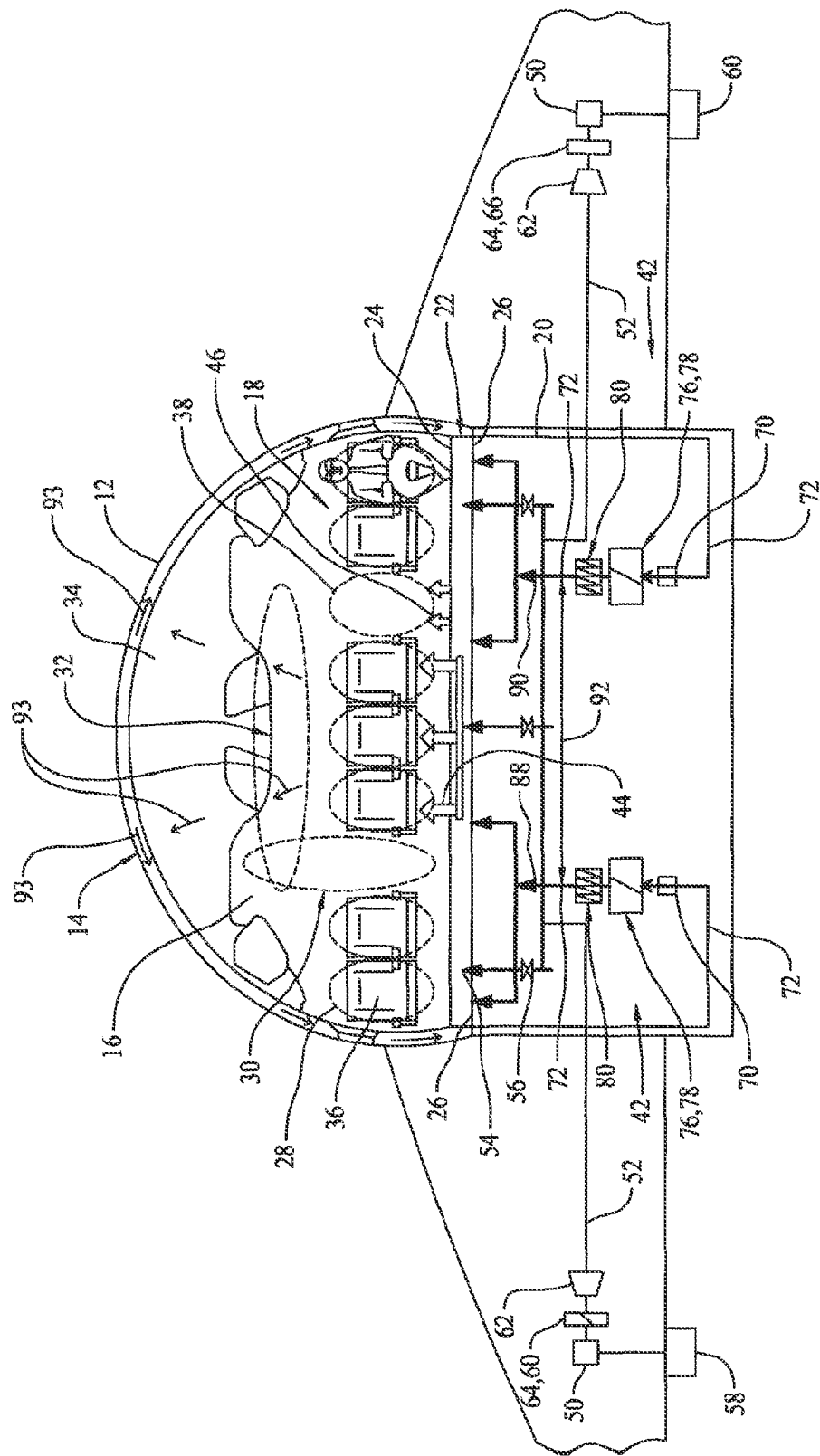
FIG. 5 illustrates a schematic diagram of exemplary air flows for the air supply system and for the air recirculation system shown in FIGS. 2 and 3.

FIG. 5 illustrates a schematic diagram of air flows for air supply system 40 and air recirculation system 42. During an exemplary operation, external air mass 44 is channeled in through external air supply device 50. External air supply device 50 then provides at least a portion of external air mass 44 to interior volume 16 of aircraft 12. More particularly, external air supply device 50 is configured to channel external air mass 44 through supply duct 52 and through air-conditioning pack 62 that compresses external air mass 44 and provides at least a portion of compressed external air mass 44 to interior volume 16 of aircraft 12. In the exemplary embodiment, at least a portion of external air mass 44 can include engine bleed air (e.g., air extracted from a compressor section (not shown) of turbine engine associated with, or carried by, aircraft 12). Moreover, external air mass 44 is channeled through filtration device 64 and VOC/O3 converter 66 via supply duct 52. Supply duct 52 is configured to channel external air mass 44 through diffuser 68 of air supply outlet 54 and into occupancy zone 28. Air supply system 40 is configured to channel external air mass 44 into occupancy zone 28 to facilitate meeting air quality loading requirements. Controller 48 (shown in FIG. 1) is coupled to flow control device 56 and/or diffuser 68 and is configured to selectively open and close flow control device 56 and/or diffuser 68 to control flow of external air mass 44 from external air supply device 50, through supply duct 52, out of air supply outlet 54 and into occupancy zone 28.

Moreover, during an exemplary operation, recirculated air mass 46 is channeled through recirculation supply device 70. Recirculation supply device 70 is configured to move recirculated air mass 46 within different portions of interior volume 16 at varying supply flow rates. More particularly, recirculation supply device 70 is configured to channel recirculated air mass 46 through recirculation duct 72 and through associated filters 76 and purifiers 78. Recirculated air mass 46 is then channeled through heat exchanger 80 which is configured to condition the temperature of recirculated air mass 46. Recirculation duct 72 is configured to channel recirculated air mass 46 into floor distribution section 22 wherein diffusers 86 of recirculation outlets 74 discharge recirculated air mass 46 from floor distribution section 22 and into recirculation zone 30.

Recirculated air mass 46 then mixes with external air mass 44 that is present in occupancy zone 28 to facilitate forming a mixed air 93 in mixing zone 32. Recirculation supply device 70 continues to channel mixed air 93 through exhaust zone 34 and back into recirculation duct 72 to facilitate recirculation of mixed air 93. In the exemplary embodiment, a portion of mixed air 93 is discharged through an outflow control device 94 (shown in FIG. 1), for example a valve, out of air recirculation system 42. Controller 48 (shown in FIG. 1) is coupled to flow control device 56 and/or diffuser 86 and is configured to selectively open and close flow control device 56 and/or diffuser 86 to control flow of air recirculation from recirculation supply device 70, through recirculation duct 72 and out of recirculation outlet 74. In the exemplary embodiment, airflow pressure of air supply system 44 and airflow pressure of air recirculation system 46 is greater than pressure within passenger area 18 to facilitate channeling external air mass 44 and recirculated air mass 46 into passenger area 18 and to facilitate mixing of external air mass 44 and recirculated air mass 46 in mixing zone 32.

Figure 6:
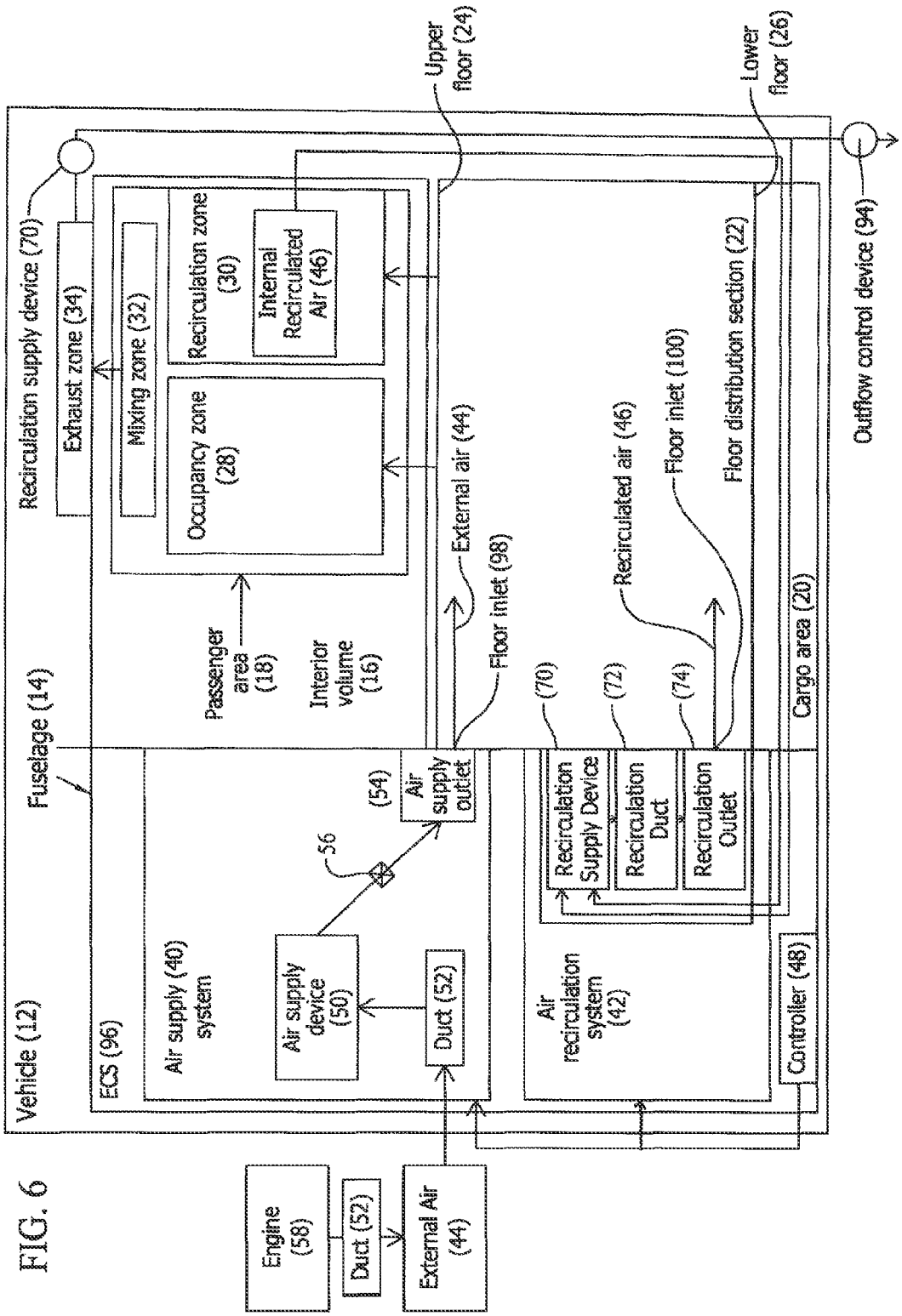
FIG. 6 illustrates a schematic diagram of the aircraft and another exemplary environmental control system that may be used with the aircraft.
Figure 7:
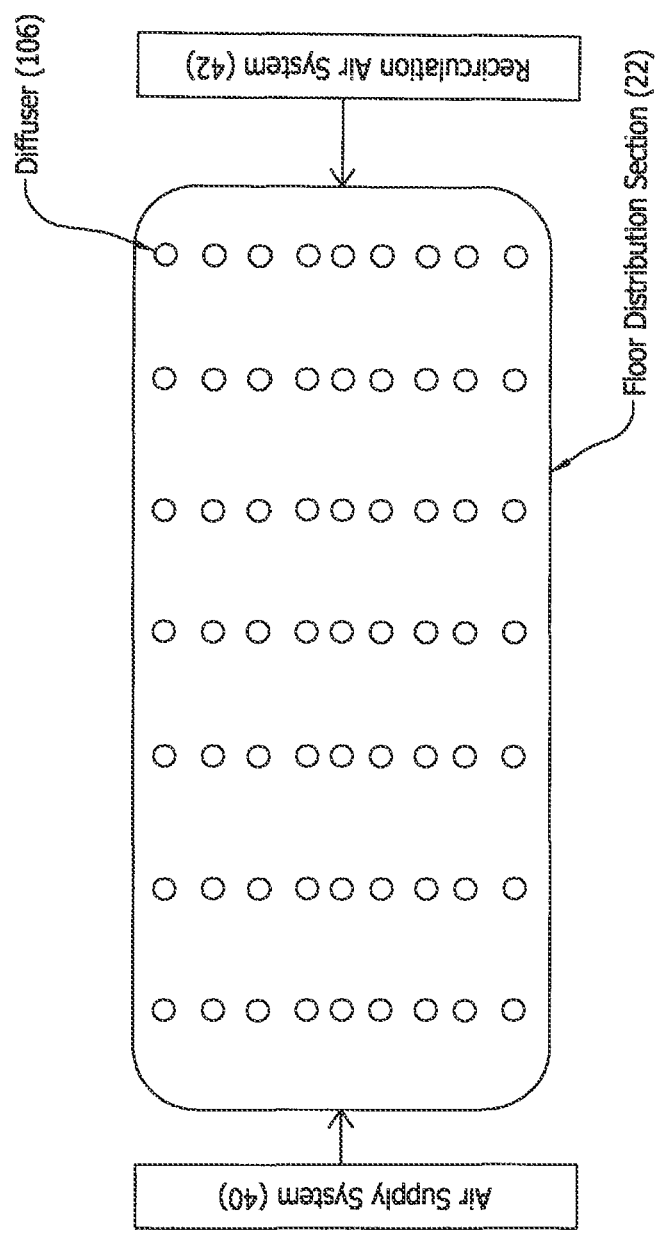
FIG. 7 illustrates a top view of a floor distribution section of the aircraft shown in FIG. 6.

FIG. 6 illustrates a schematic diagram of aircraft 12 and another exemplary environmental control system 96. FIG. 7 illustrates a top view of floor distribution section 22. For environmental control system 96, same or similar components of environmental control system 10 (shown in FIGS. 1-5) are designated with the same element numbers as environmental control system 10 (shown in FIGS. 1-5). In the exemplary embodiment, air supply outlet 54 is coupled in flow communication to floor distribution section 22. More particularly, supply duct 52 includes a floor inlet 98 that is coupled to floor distribution section 22 and in flow communication with floor distribution section 22. Floor inlet 98 is configured to discharge external air mass 44 into floor distribution section 22. Moreover, in the exemplary embodiment, recirculation duct 72 is coupled in flow communication to floor distribution section 22. More particularly, recirculation duct 72 includes a floor inlet 100 that is coupled to lower floor 26 and in flow communication with floor distribution section 22. Floor inlet 100 is configured to discharge recirculated air mass 46 into floor distribution section 22.

Figure 8:
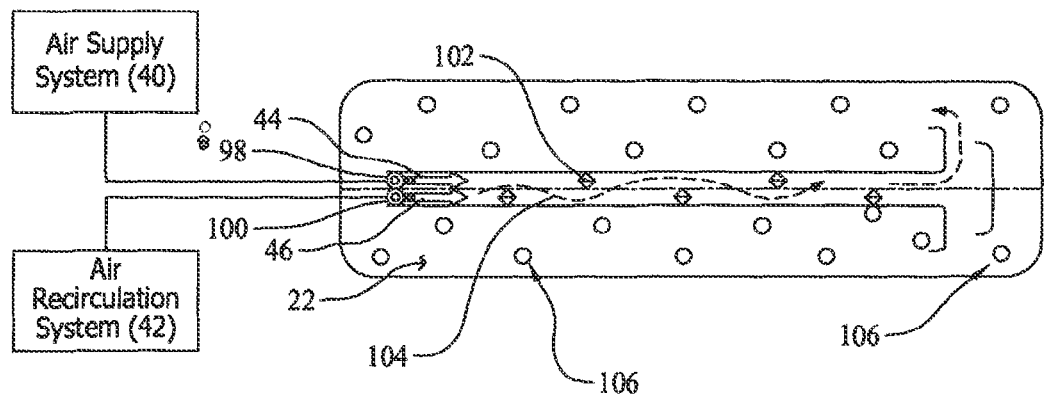
FIG. 8 illustrates another top view of the floor distribution section shown in FIG. 7.

FIG. 8 illustrates another top view of floor distribution section 22. Floor distribution section 22 includes a plurality of mixers 102 positioned between upper floor 24 and lower floor 26 (shown in FIG. 6). Each mixer 102 is configured to mix external air mass 44 with recirculated air mass 46 present in floor distribution section 22 to facilitate forming mixed air 104. In the exemplary embodiment, mixer 102 includes a configuration such as, but not limited to, vanes, fins, and columns. Any configuration that mixes external air mass 44 with recirculated air mass 46 can be used that enables environmental control system 10 to function as described herein. In the exemplary embodiment, mixers 102 are positioned offset in a repeating pattern with respect to each other within the floor distribution section 22. Alternatively, mixers 102 can be positioned in a non-repeating pattern within floor distribution section 22. Any orientation, pattern and configuration of mixers 102 can be used that enables environmental control system 96 to function as described herein.

Figure 9:
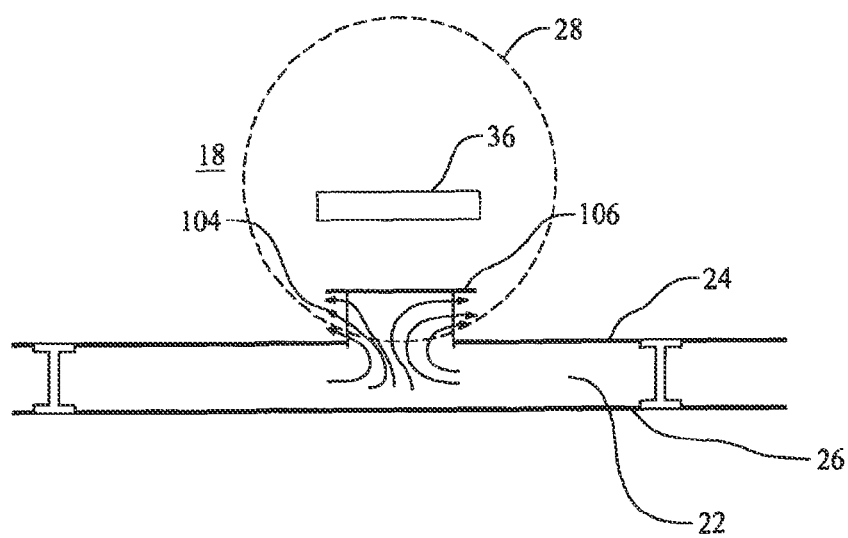
FIG. 9 illustrates a side cross sectional view of the floor distribution section shown in FIG. 7.

FIG. 9 illustrates a side cross sectional view of floor distribution section 22 and a diffuser 106 coupled to floor distribution section 22. Environmental control system 96 includes diffuser 106 coupled in flow communication to floor distribution section 22 and in flow communication to passenger area 18. Diffuser 106 is configured to discharge mixed air 104 into at least one of occupancy zone 28, recirculation zone 30 and mixing zone 32 (shown in FIG. 6). In the exemplary embodiment, diffuser 106 is coupled in flow communication to occupancy zone 28. More particularly, diffuser 106 is coupled in flow communication to upper floor 24 and near at least one seat 36 of the plurality of seats 36. Diffuser 106 is configured to discharge mixed air 104 into occupancy zone 28 and about and/or around at least one seat 36. In the exemplary embodiment, diffuser 106 is coupled to upper floor 24 and in a position underneath at least one seat 36. Alternatively, diffuser 106 can be located in any position and/or orientation with respect to upper floor 24 and/or passenger area 18 that enables environmental control system 96 to function as described herein.

Figure 10:
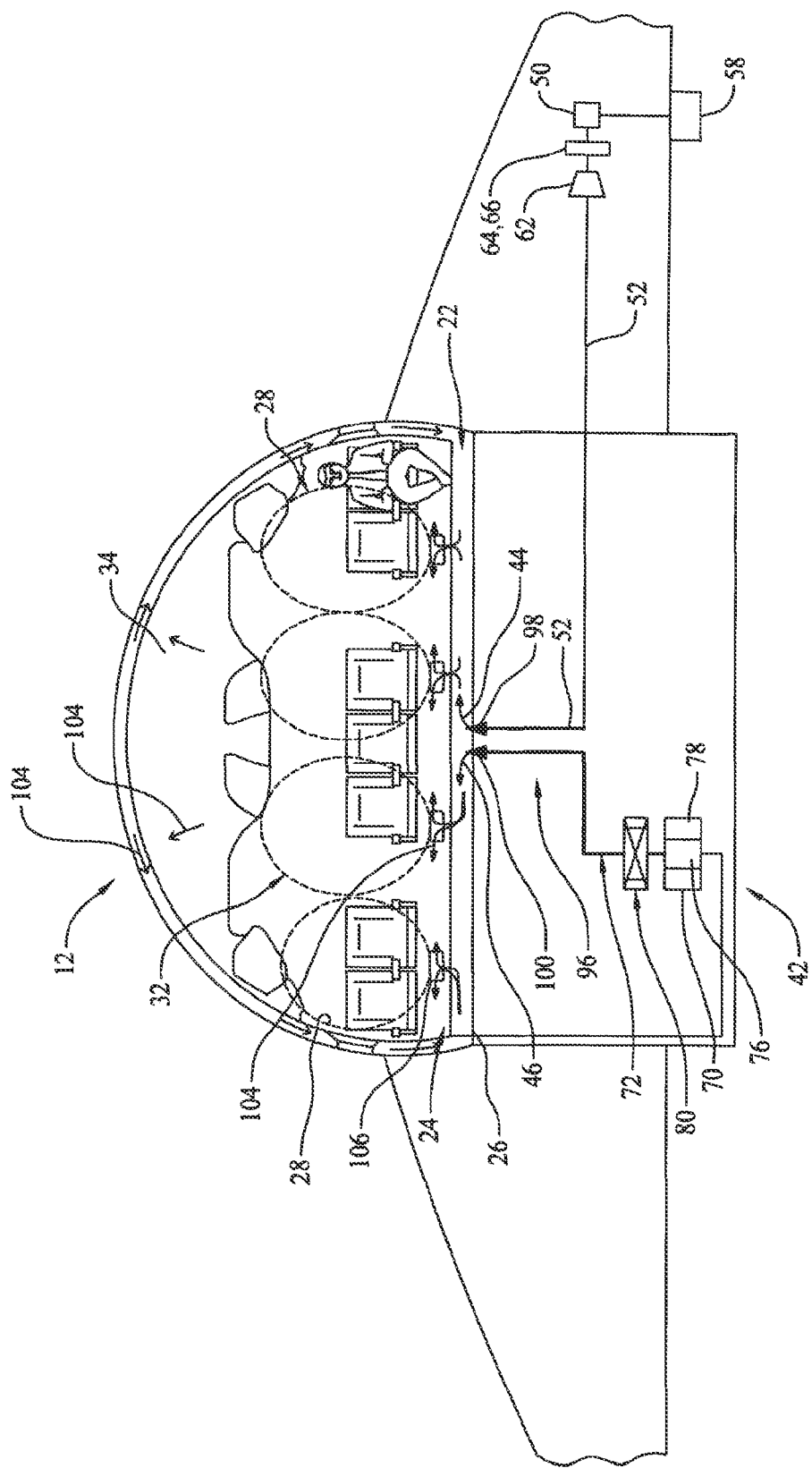
FIG. 10 illustrates a schematic diagram of exemplary air flows for an air supply system and for an air recirculation system shown in FIG. 6.

FIG. 10 illustrates a schematic diagram of exemplary air flows for air supply system 40 and for air recirculation system 42 shown in FIG. 6. During an exemplary operation, external air mass 44 is channeled in through external air supply device 50. External air supply device 50 then provides at least a portion of external air mass 44 to interior volume 16. More particularly, external air supply device 50 is configured to channel external air mass 44 through supply duct 52 and through air-conditioning pack 62 that compresses external air mass 44 and provides at least a portion of compressed external air mass 44 to interior volume 16. In the exemplary embodiment, at least a portion of external air mass 44 can include engine bleed air (e.g., air extracted from a compressor section (not shown) of turbine engine associated with, or carried by, aircraft 12). Moreover, external air mass 44 is channeled through filtration device 64 and VOC/O3 converter 66. External air supply device 50 is configured to channel external air mass 44 through supply duct 52 and through inlet 98 (shown in FIG. 6) and channeled into floor distribution section 22 via inlet 98.

Moreover, during an exemplary operation, recirculated air mass 46 is channeled through recirculation supply device 70. More particularly, recirculation supply device 70 is configured to channel recirculated air mass 46 through recirculation duct 72 and through associated filters 76 and purifiers 78. Recirculated air mass 46 is then channeled through heat exchanger 80 which is configured to condition the temperature of recirculated air mass 46. Recirculation duct 72 is configured to channel recirculated air mass 46 through inlet 100 and into floor distribution section 22. Floor distribution section 22 is configured to facilitate mixing external air mass 44 and recirculated air mass 46. More particularly, floor distribution section 22 is configured to facilitate mixing external air mass 44 and recirculated air mass 46 to form mixed air 104. Mixed air 104 is channeled through diffuser 106 and into occupancy zone 28. Mixed air 104 then mixes with external air mass 44 that is present in occupancy zone 28. Recirculation supply device 70 continues to channel mixed air 104 through exhaust zone 34 and back into recirculation duct 72 to facilitate recirculation of mixed air 104. In the exemplary embodiment, a portion of recirculated air mass 46 is discharged through outflow control device 94 (shown in FIG. 6) out of air recirculation system 42. In the exemplary embodiment, airflow pressure of air supply system 44 and airflow pressure of air recirculation system 46 is greater than pressure within floor distribution section 22 to facilitate channeling external air mass 44 and recirculated air mass 46 into floor distribution section 22 and to facilitate mixing of external air mass 44 and recirculated air mass 46 in floor distribution section 22.

Figure 11:
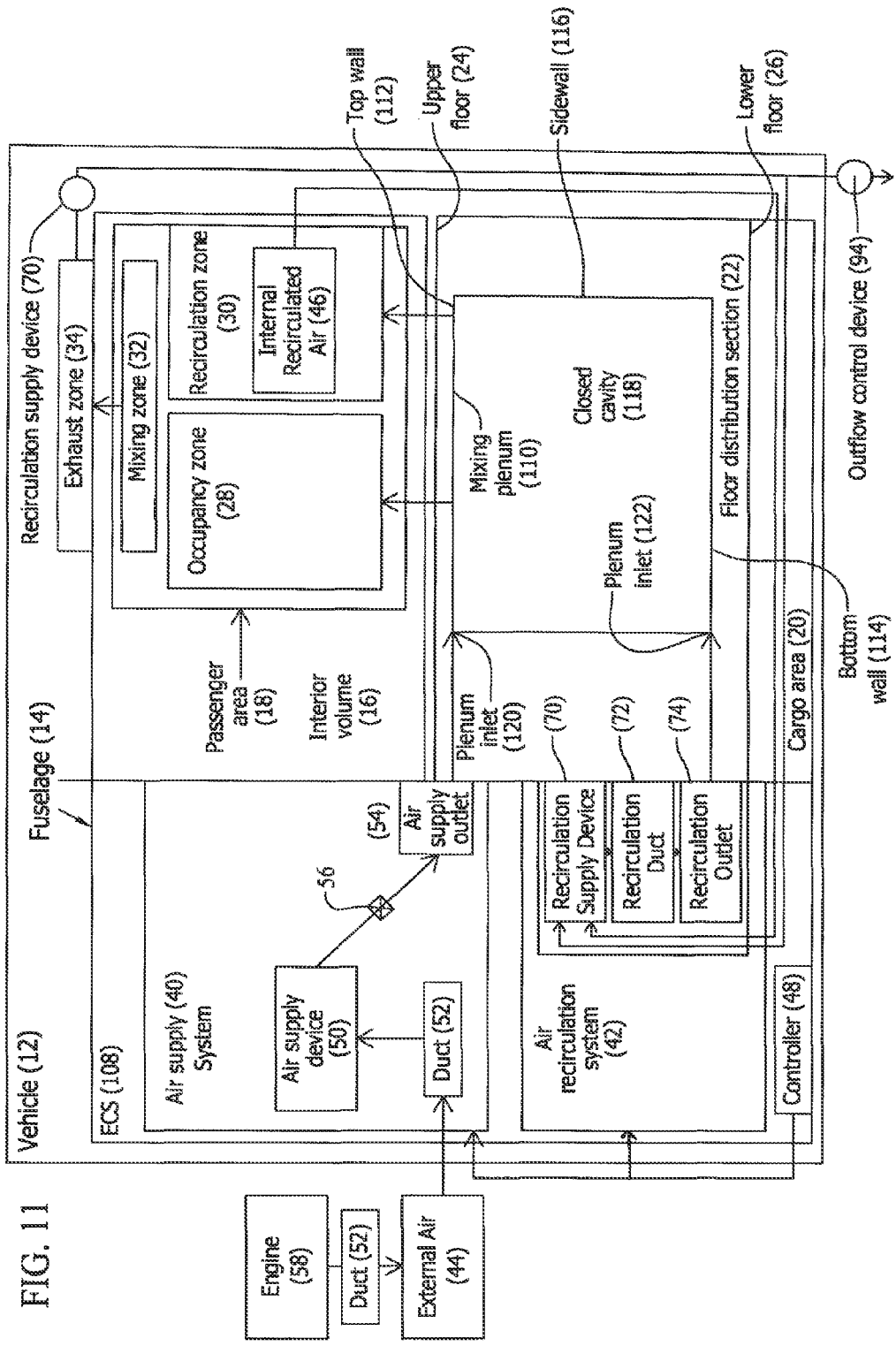
FIG. 11 illustrates a schematic diagram of an aircraft and another exemplary environmental control system that may be used with the aircraft.
Figure 12:
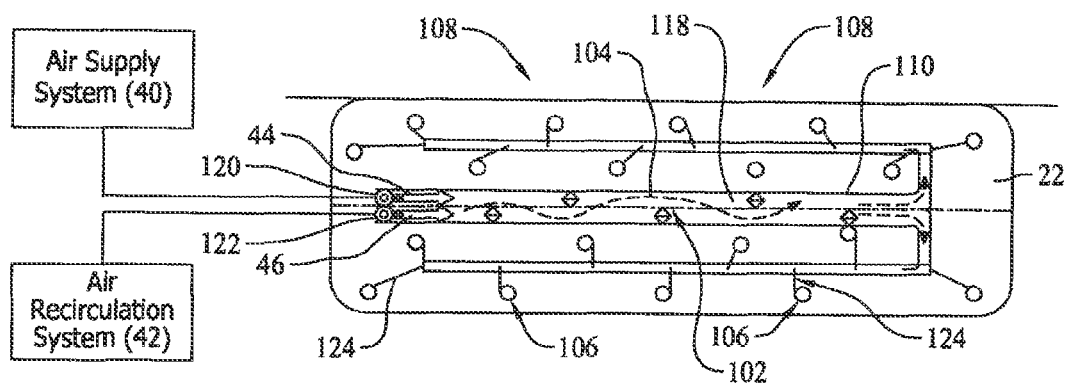
FIG. 12 illustrates a top view of a floor distribution section for the aircraft shown in FIG. 11.
Figure 13:
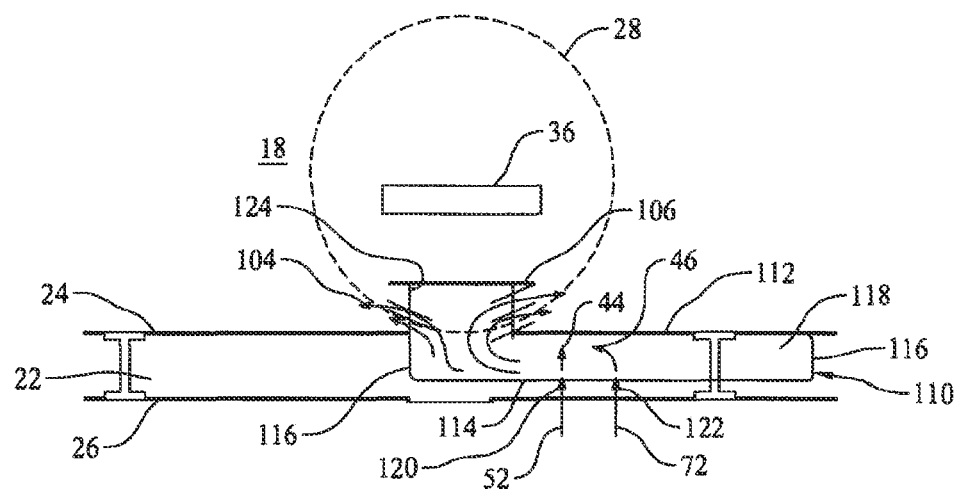
FIG. 13 illustrates a side cross sectional view of the floor distribution section and an exemplary mixing plenum of the environmental control system shown in FIG. 11.

FIG. 11 illustrates a schematic diagram of aircraft 12 and another exemplary environmental control system 108. FIG. 12 illustrates a top view of floor distribution section 22 shown in FIG. 11. FIG. 13 illustrates a side cross sectional view of floor distribution section 22 and a mixing plenum 110 of environmental control system 108. For environmental control system 108, same or similar components of environmental control system 10 (shown in FIGS. 6-10) are designated with the same element numbers as environmental control system 10 (shown in FIGS. 6-10). In the exemplary embodiment, environmental control system 108 includes mixing plenum 110 disposed within floor distribution section 22. Mixing plenum 110 includes a top wall 112, bottom wall 114 and sidewalls 116 disposed between top wall 112 and bottom wall 114. Top wall 112, bottom wall 114 and side walls 116 are configured to define a closed cavity 118 therein.

In the exemplary embodiment, supply duct 52 is coupled in flow communication to mixing plenum 110. More particularly, supply duct 52 includes a plenum inlet 120 that is coupled to bottom wall 114 and in flow communication with cavity 118. Plenum inlet 120 is configured to discharge external air mass 44 into cavity 118. In the exemplary embodiment, recirculation duct 72 is coupled in flow communication to mixing plenum 110. More particularly, recirculation duct 72 includes a plenum inlet 122 that is coupled to bottom wall 114 and in flow communication with cavity 118. Plenum inlet 122 is configured to discharge recirculated air mass 46 into cavity 118.

Mixing plenum 110 includes a plurality of mixers 102 positioned between top wall 112 and bottom wall 114. Each mixer 102 is configured to mix external air mass 44 with recirculated air mass 46 present in cavity 118 to facilitate forming mixed air 104. In the exemplary embodiment, mixer 102 includes a configuration such as, but not limited to, vanes, fins, and columns. Any configuration that mixes external air mass 44 with recirculated air mass 46 can be used that enables environmental control system 108 to function as described herein. In the exemplary embodiment, mixers 102 are positioned offset in a repeating pattern with respect to each other within mixing plenum 110. Alternatively, mixers 102 can be positioned in a non-repeating pattern within mixing plenum 110. Any orientation, pattern and configuration of mixers 102 can be used that enables environmental control system 108 to function as described herein.

Environmental control system 108 includes diffuser 106 coupled to mixing plenum 110 and in flow communication to cavity 118 and passenger area 18. In the exemplary embodiment, mixing plenum 110 includes a plurality of outlet ducts 124 coupled in flow communication to each diffuser 106. Ducts 124 are configured to channel mixed air 104 from cavity 118 and through diffuser 106. Diffuser 106 is configured to discharge mixed air 104 into at least one of occupancy zone 28, recirculation zone 30 and mixing zone 32. In the exemplary embodiment, diffuser 106 is coupled in flow communication to occupancy zone 28. More particularly, diffuser 106 is coupled to top wall 112 and near at least one seat 36 of the plurality of seats 36. Diffuser 106 is configured to discharge mixed air 104 into occupancy zone 28 and about and/or around seat 36. In the exemplary embodiment, diffuser 106 is coupled to upper floor 24 and in a position underneath seat 36.

Figure 14:
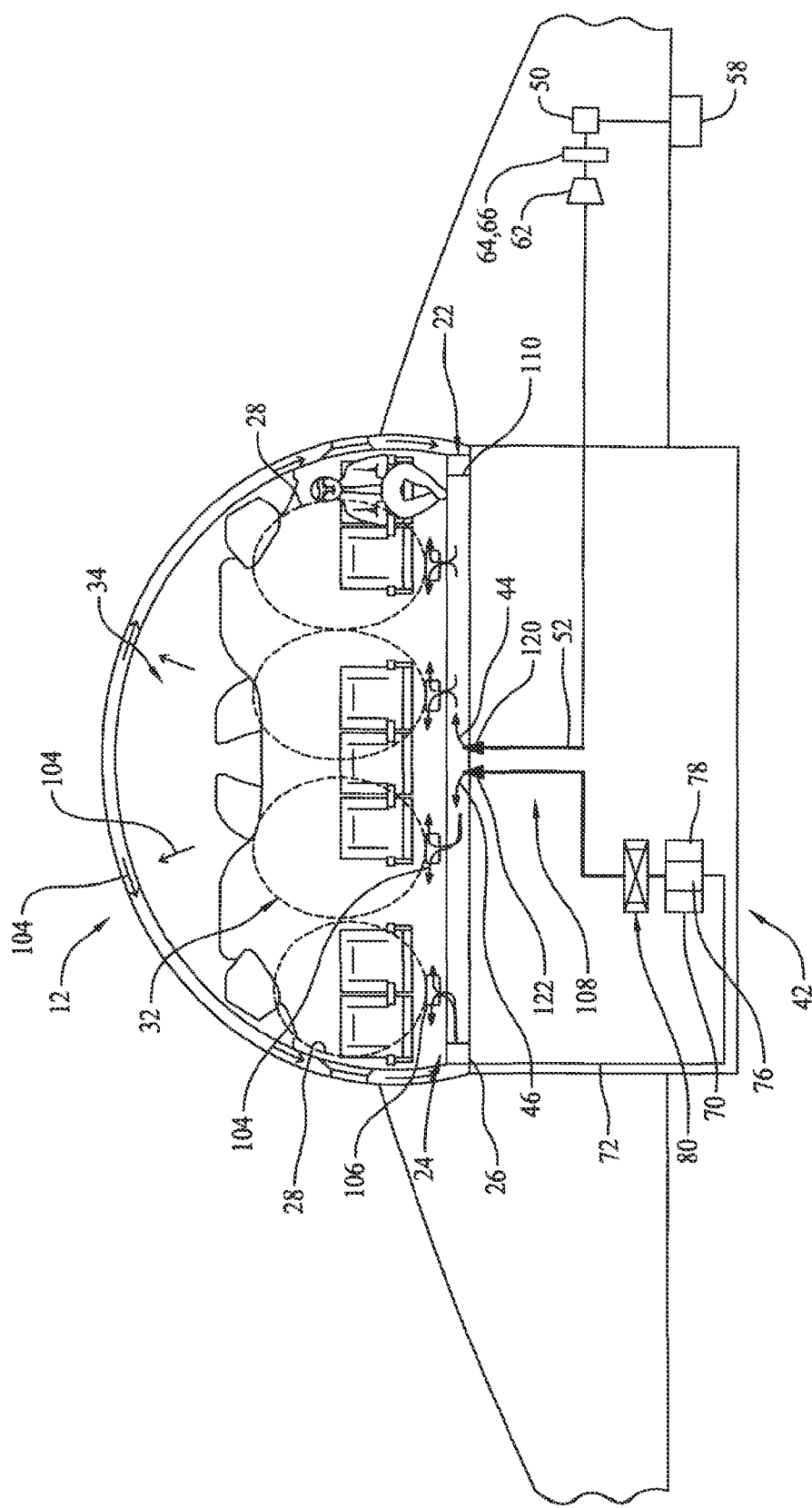
FIG. 14 illustrates a schematic diagram of exemplary air flows for the air supply system and for the air recirculation system shown in FIG. 11.

FIG. 14 illustrates a schematic diagram of exemplary air flows for air supply system 40 and for air recirculation system 42 shown in FIG. 11. During an exemplary operation, external air mass 44 is channeled in through external air supply device 50. External air supply device 50 then provides at least a portion of external air mass 44 to interior volume 16. More particularly, external air device 50 is configured to channel external air mass 44 through supply duct 52 and through air-conditioning pack 62 that compresses external air mass 44 and provides at least a portion of compressed external air mass 44 to interior volume 16. In the exemplary embodiment, at least a portion of external air mass 44 can include engine bleed air (e.g., air extracted from a compressor section (not shown) of turbine engine associated with, or carried by, aircraft 12). Moreover, external air mass 44 is channeled through filtration devices 64 and VOC/O3 converter 66. External air supply device 50 is configured to channel external air mass 44 through supply duct 52 and through plenum inlet 120. External air mass 44 is then channeled into cavity 118 of mixing plenum 110.

Moreover, recirculated air mass 46 is channeled through recirculation supply device 70. More particularly, recirculation supply device 70 is configured to channel recirculated air mass 46 through recirculation duct 72 and through associated filters 76 and purifiers 78. Recirculated air mass 46 is then channeled through heat exchanger 80 which is configured to condition the temperature of recirculated air mass 46. Recirculation duct 72 is configured to channel recirculated air mass 46 through inlet 122 and into cavity 118 of mixing plenum 110. Cavity 118 and mixers 102 are configured to facilitate mixing external air mass 44 and recirculated air mass 46. More particularly, cavity 118 is configured to facilitate mixing external air mass 44 and recirculated air mass 46 to form mixed air 104. Mixed air 104 is channeled through diffuser 106 and into occupancy zone 28. Recirculation supply device 70 continues to channel mixed air 104 through exhaust zone 34 and back into recirculation duct 72 to facilitate recirculation of mixed air 104. In the exemplary embodiment, a portion of recirculated air mass 46 is discharged through outflow control device 94 (shown in FIG. 11), for example a valve, out of air recirculation system 42. In the exemplary embodiment, airflow pressure of air supply system 44 and airflow pressure of air recirculation system 46 is greater than pressure within mixing plenum 110 to facilitate channeling external air mass 44 and recirculated air mass 46 into mixing plenum 110 and to facilitate mixing of external air mass 44 and recirculated air mass 46 in mixing plenum 110.

Figure 15:
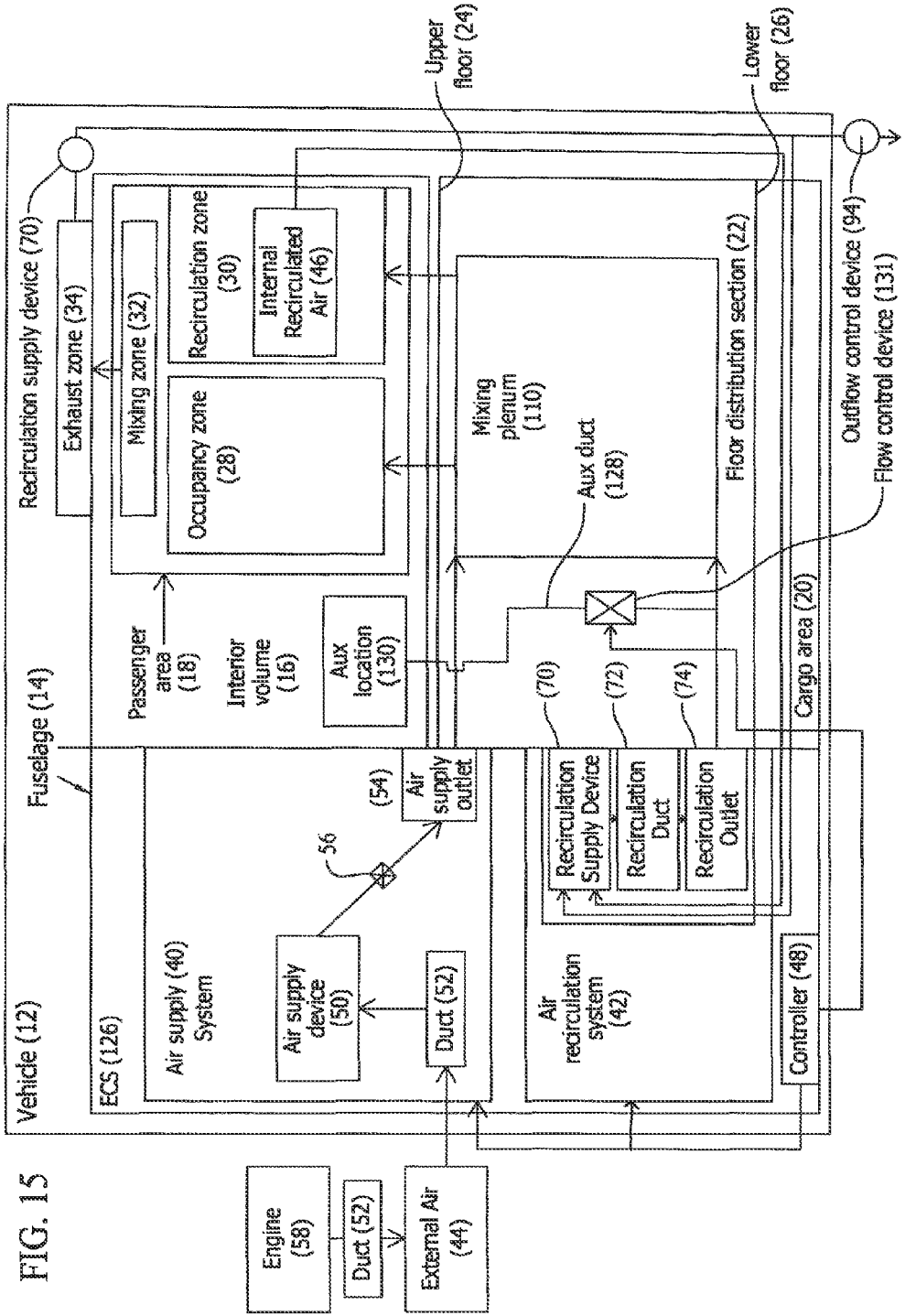
FIG. 15 illustrates a schematic diagram of an aircraft and another exemplary environmental control system that may be used with the aircraft.
Figure 16:
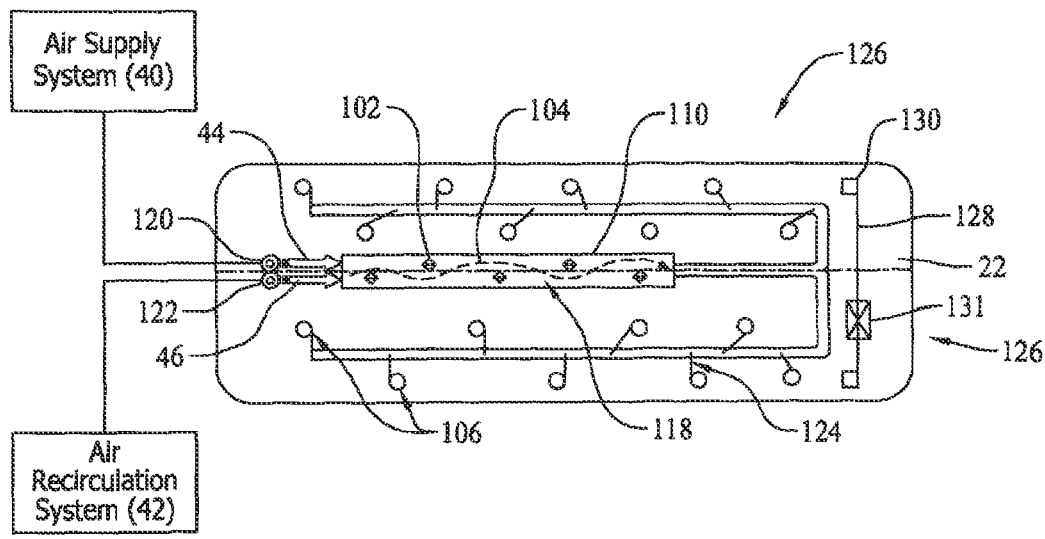
FIG. 16 illustrates a top view of a floor distribution section for the aircraft shown in FIG. 15.
Figure 17:
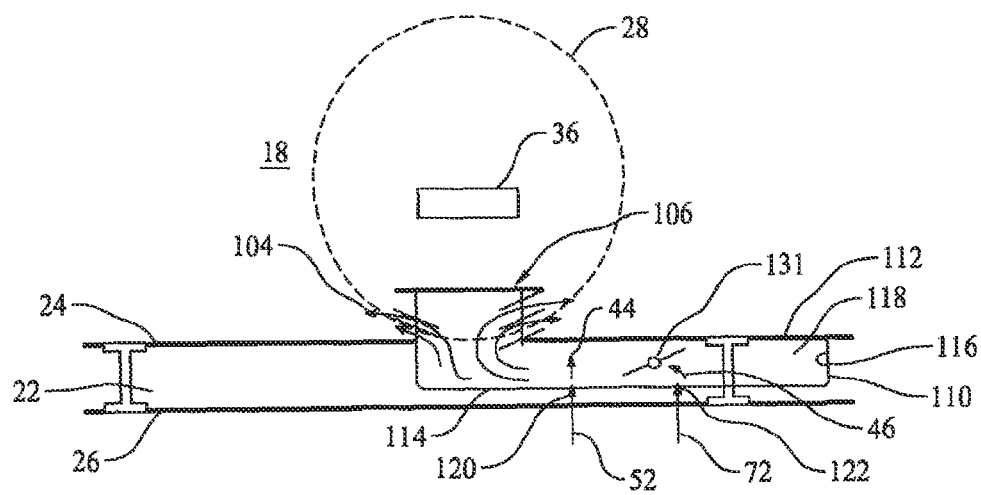
FIG. 17 illustrates a side cross sectional view of the floor distribution section shown in FIG. 16.

FIG. 15 illustrates a schematic diagram of aircraft 12 and another exemplary environmental control system 126. FIG. 16 illustrates a top view of floor distribution section 22 shown in FIG. 15. FIG. 17 illustrates a side cross sectional view of floor distribution section 22 shown in FIG. 15. For environmental control system 126, same or similar components of environmental control system 108 (shown in FIGS. 11-14) are designated with the same element numbers as environmental control system 108 (shown in FIGS. 11-14). In the exemplary embodiment, environmental control system 126 includes an auxiliary duct 128 coupled in flow communications to recirculation duct 72 between cargo area 20 and floor distribution section 22. More particularly, auxiliary duct 128 is coupled to recirculation duct 72 between heat exchanger 80 and mixing plenum 110. Moreover, auxiliary duct 128 is coupled in flow communication to an auxiliary location 130 in interior volume 16 such as, but not limited to, a service area. Environmental control system 126 includes flow control device 131 such as, for example, variable air volume valve.

Figure 18:
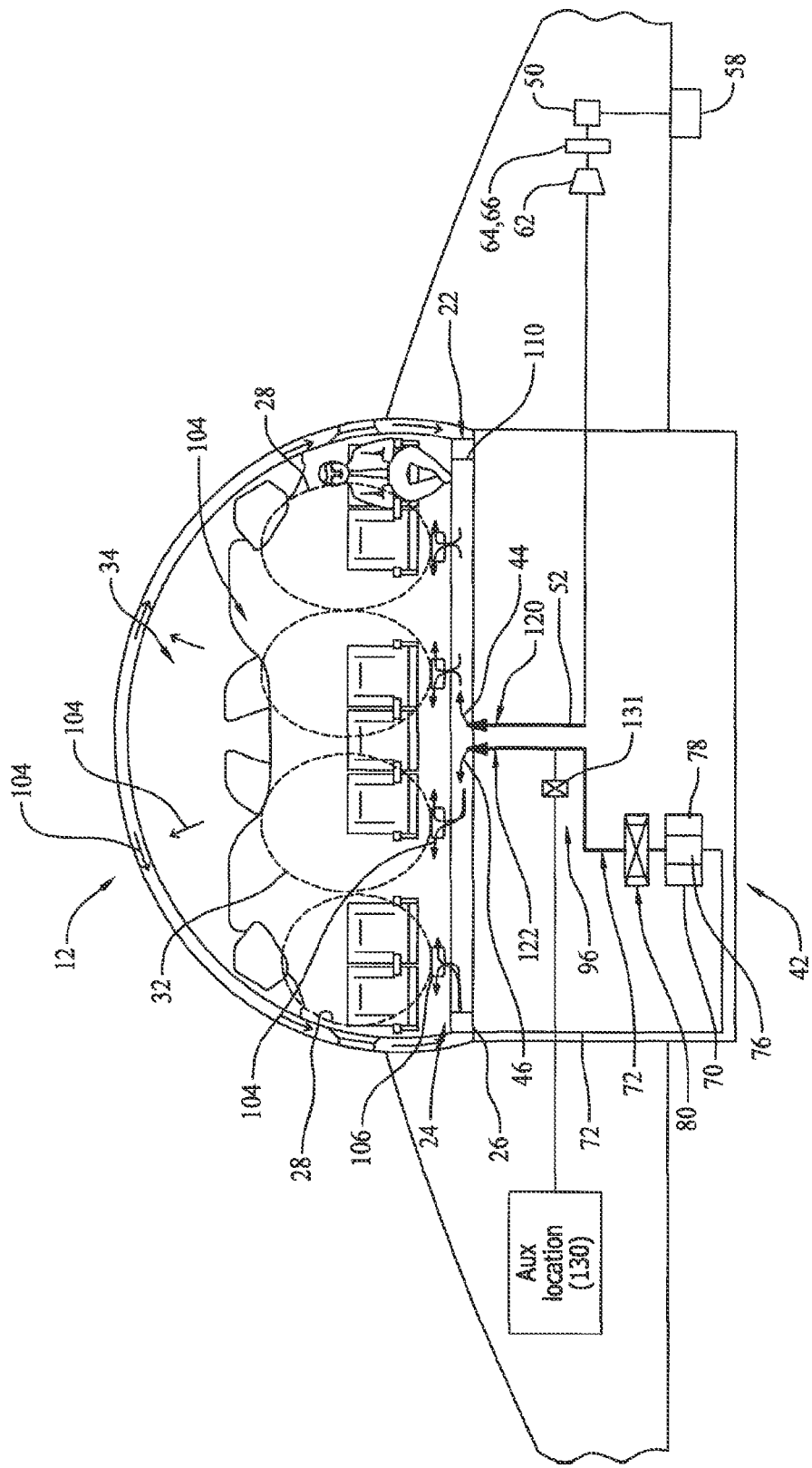
FIG. 18 illustrates a schematic diagram of exemplary air flows for the air supply system and for the air recirculation system shown in FIG. 15.

FIG. 18 illustrates a schematic diagram of exemplary air flows for the air supply system and for the air recirculation system shown in FIG. 15. Controller 48 (shown in FIG. 1) is coupled to flow control device 131 and is configured to selectively open and close flow control device 131 to control flow of air recirculation from recirculation duct 72 through auxiliary duct 28 and into auxiliary location 130. Flow control device 132 is configured to control the rate of recirculated air mass 46 into auxiliary duct 128 based on at least thermal loading of interior volume 16 and flight condition. Moreover, air supply system 40 is configured to channel external air mass 44 into mixing plenum 110 and air recirculation system 42 is configured to channel recirculated air mass 46 into mixing plenum 110 to facilitate forming mixed air 104 as previously described.

Figure 19:
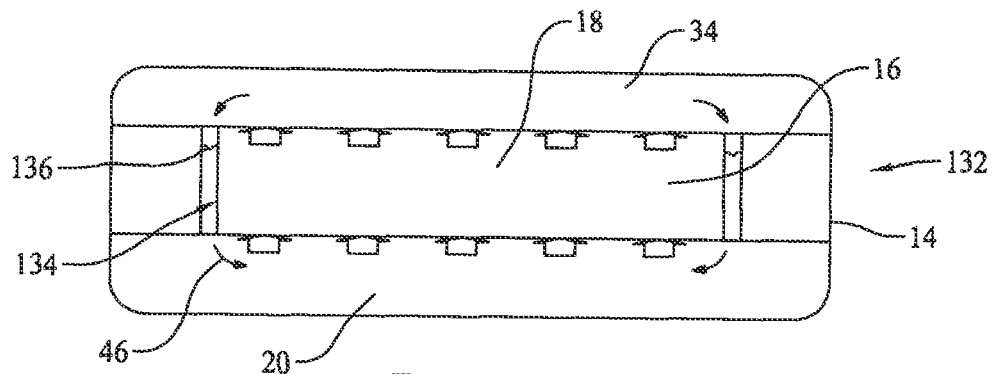
FIG. 19 illustrates a cross sectional view of an exemplary fuselage for an aircraft and an exemplary air flow device disposed within the fuselage.

FIG. 19 illustrates a cross sectional view of fuselage 14 and another environmental control system 132 disposed within fuselage 14. Environmental control system 132 includes at least one air flow device 134 that is coupled in flow communication to exhaust zone 34 and to cargo area 20, wherein at least one fan 136 is coupled to air flow device 134. In the exemplary embodiment, air flow device 134 includes a channel structure such as, but not limited to, a pipe, duct and/or vent. Air flow device 134 and fan 136 are configured to facilitate controlling pressure differences among passenger area 18, cargo area 20 and exhaust zone 34. More particularly, air flow device 134 and fan 136 are configured to control flow of recirculated air mass 46 from passenger area 18 into exhaust zone 34 and into cargo area 20. Although decompression is a rare event, environmental control systems 10, 96, 108, and 126 disclosed herein may include environmental control system 132 which is configured to handle cabin decompressions that may occur from undetected metal fatigue that can remove a portion of the vehicle's skin (not shown) in midair with a small hole in fuselage.

Figure 20:
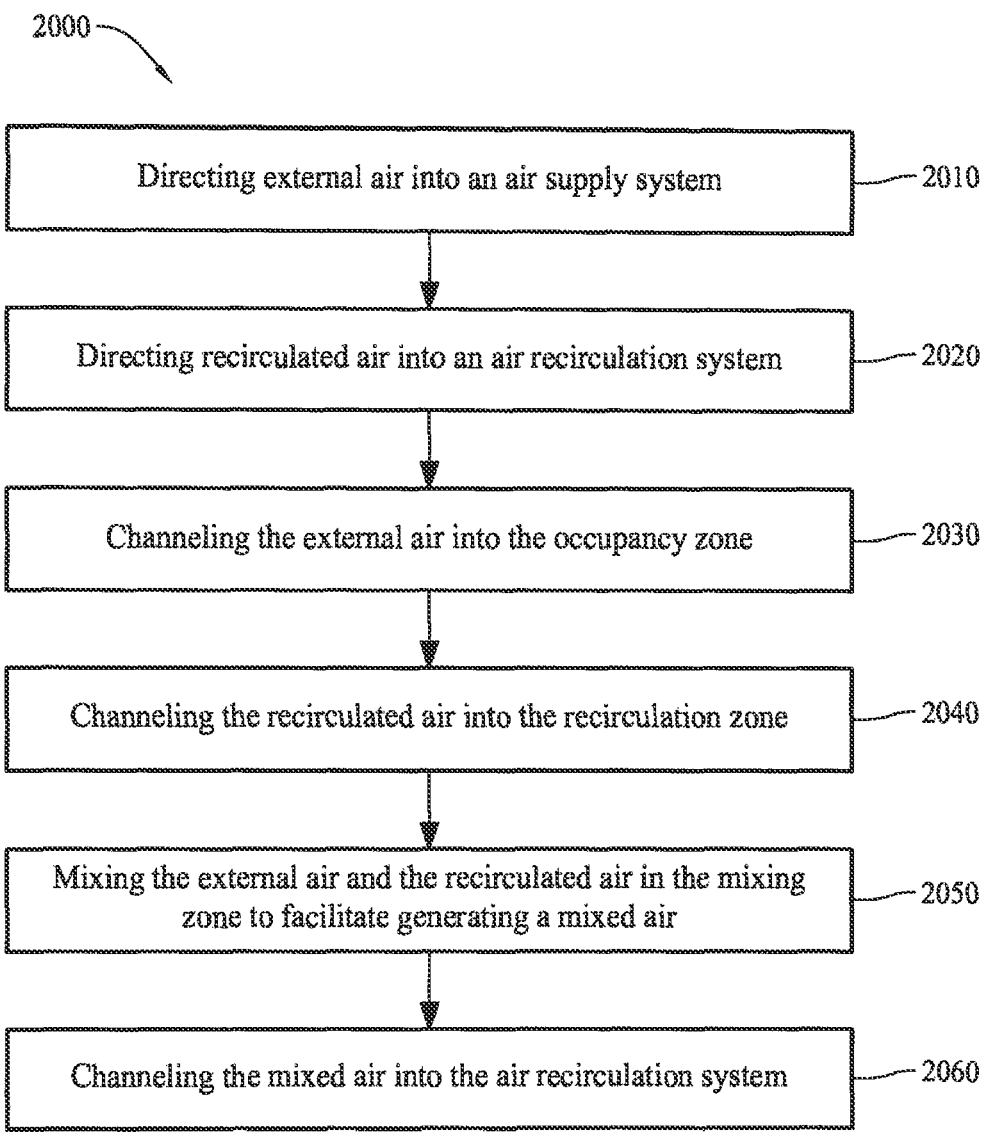
FIG. 20 illustrates a flowchart for an exemplary method for controlling an environment of an aircraft.

FIG. 20 illustrates a flowchart for an exemplary method 2000 for environmentally controlling interior volume 16 of aircraft 12 having floor distribution section that is coupled in fluid communication to occupancy zone and recirculation zone, such as for example occupancy zone 28 and recirculation zone 30 (shown in FIG. 1). Method includes directing 2010 external air, for example external air mass 44, into an air supply system such as air supply system 40 (shown in FIG. 2). Moreover, recirculated air, for example recirculated air mass 46 is directed 2020 into an air recirculation system such as air recirculation system 42 (shown in FIG. 3). Method 2000 includes channeling 2030 the external air into the occupancy zone and channeling 2040 the recirculated air into the mixing zone. Moreover, method 2000 includes mixing 2050 the external air and the recirculated air in the mixing zone to facilitate generating a mixed air, for example mixed air 104 (shown in FIG. 5). The mixed air is channeling mixed 2060 air into the air recirculation system.

For the embodiments disclosed herein, external air is supplied around occupant seats located in occupancy zone at a flow rate compliant with aviation regulations. In the exemplary embodiments, flow rate of air near occupant includes parameters such as, but not limited to, from about 0.35 lb/occy/min to about 0.75 lb/occy./min; from about 7 CFM to about 10 CFM per seat; outlet velocity from about 0.3 ft/s to about 1.8 ft/s (from about 0.1 m/s to about 0.55 m/s); temperature from about 60° F. to about 80° F.+/−5° F.; and humidity from about 10% to about 20%. More particularly, in an embodiment, flow rate of air includes parameters such as, but not limited to, 0.55 lb/occy./min; temperature of about 75° F.; outlet velocity less than about 0.66 ft/s (0.2 m/s) and humidity from about 10% to 20%. The size and location of outlets and diffusers can be adjustable for different air flow velocity. Moreover, outlets are configured are to minimize and/or eliminate large temperature differences and drafts within interior volume. For the embodiments disclosed, air recirculation system is configured to remove thermal loading from components, for example power feeders, in floor distribution section and/or cargo area. The embodiments disclosed herein are configured to minimize and/or eliminate smoke penetration. More particularly, the embodiments disclosed herein are configured to maintain cabin pressure higher than cargo pressure to facilitate maintaining any smoke in cargo area. The embodiments disclosed herein include smoke and/or pressure sensors to monitor pressure differences and to control and/or adjust cabin/cargo air flow rates based on pressure differences to facilitate reducing and/or eliminating smoke penetration into cabin area. The embodiments disclosed herein can operate with and/or without heat exchangers.

Moreover, for the embodiments described herein, external air supply device and the air recirculation device are operably coupled to controller via signal pathways (not shown). Controller can be distributed among multiple components and can include portions of a computer or computing system, mechanical devices, electromechanical devices, and/or the like. In selected embodiments, controller can be programmed with instructions for determining required supply flow rate(s) and/or recirculation flow rate(s) based on operational conditions/considerations. Controller can then command air supply system and/or air recirculation system to provide at least approximately the determined supply flow rate(s) and/or recirculation flow rate(s), respectively. Additionally, controller can vary the supply flow rate(s) and/or recirculation rate(s) as operational conditions change.

Controller can also be operably coupled to flow control devices via a signal pathway (not shown) and can control the supply flow rate and flow control devices to control pressurization as vehicle climbs and descends. Flow control devices can be configured to control the release of exhaust air from vehicle. Controller can be configured to control the supply flow rate (e.g., external air entering interior of vehicle) and flow control devices to provide a selected pressure in interior and/or a selected pressure differential between the interior and exterior of vehicle.

In the embodiments described herein, controller can vary the supply flow rate based on the number of vehicle occupants that are carried on vehicle. For instance, governmental regulations may require a minimum external airflow rate per occupant to during flight. In still other embodiments, the supply flow rate can be varied to ensure adequate thermal control, adequate equipment cooling, adequate cargo exhaust, adequate lavatory exhaust, adequate galley exhaust, and/or adequate smoke suppression/evacuation in a smoke event. Controller can use stored information, sensed information, information provided by an operator, and/or information supplied by a data link to determine flow rate requirements.

More particularly, controller can vary the recirculation flow rate in response to variations in the supply flow rate and/or based on various operational conditions/considerations similar to those discussed above. For example, in the exemplary embodiment, controller can vary the recirculation flow rate as the supply flow rate is increased or decreased so that the total flow rate (e.g., volumetric or mass flow rate) at selected locations remains at least approximately constant. In certain embodiments where air recirculation device includes a variable speed recirculation fan, controller can determine the rotation speed of the recirculation fan to provide at least approximately a desired recirculation flow rate and control/command the rotation speed of recirculation fan accordingly. In selected embodiments, this feature can allow a reduction in external air requirements, thereby increasing vehicle fuel economy while maintaining desirable cabin flow rates via the increase in recirculation flow rates. For example, controller can reduce the supply flow rate and increase the recirculation flow rate during selected phases of flight and/or above selected altitudes to improve fuel economy.

In the exemplary embodiments, environmental control systems include sensors (not shown) which are configured to sense various characteristics associated with air in vehicle interior. For example, sensors can be configured to sense air pressure, airflow rates (e.g., volumetric flow rates and/or mass flow rates), air temperature, air humidity, and/or airborne contaminants (e.g., including particulate contaminants, gaseous contaminants, biological elements, and/or chemical elements).

In the exemplary embodiments, controller can be configured to adjust the supply flow rate and/or the recirculation flow rate in response to one or more characteristics sensed by sensors. For example, in selected embodiments, controller can increase the supply flow rate (e.g., and external air entering interior of vehicle) if sensor(s) detect that a selected concentration of a selected contaminant (e.g., CO and/or $CO_2$) has been met or exceeded in order to reduce the concentration of the contaminant in interior. In other embodiments, controller can decrease the supply flow rate and send signal to flight deck or maintenance station for VOC/O3 converter checking if excessive $O_3$ is sensed in interior of vehicle to decrease the concentration of $O_3$. In still other embodiments, controller can increase supply flow rates, increase the release of exhaust air through flow control devices, and decrease or cease the flow of air recirculation in the event of certain smoke conditions to evacuate smoke from interior of vehicle. In yet other embodiments, controller can increase the supply flow rate to increase equipment cooling in the event that excessive temperatures are sensed in the electronics bay location and/or on selected electronic components. In still other embodiments, controller can use the combination of supply flow rate and recirculation flow rate to aid in temperature control and/or pressurization control of interior of vehicle.

The thermal loading (cooling/heating loading) for commercial airplane are dynamically changing in terms of the different flight and ground conditions. The thermal loadings include: heating or cooling loads from ambient through the fuselage; lighting; occupancy; electronics bay, IFE and other electrical devices etc. For maintaining a comfortable cabin environment, the embodiments described herein are configured to remove these thermal loadings.

Exemplary embodiments of systems and methods for environmental control system are described above in detail. The systems and methods are not limited to the specific embodiments described herein, but rather, components of systems and/or steps of the method may be utilized independently and separately from other components and/or steps described herein. Each component and each method step may also be used in combination with other components and/or method steps. Although specific features of various embodiments may be shown in some drawings and not in others, this is for convenience only. Any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. An aircraft comprising:
a fuselage comprising a passenger area and a cargo area, said passenger area having an occupancy zone including locations where passengers are seated and a recirculation zone adjacent to said occupancy zone and including locations where passengers are not seated and does not overlap with said occupancy zone;
a floor distribution section coupled in flow communication to said occupancy zone and said recirculation zone, and defined between an upper floor and a lower floor in said fuselage, wherein said upper floor at least partially defines said passenger area and said lower floor at least partially defines said cargo area;
an air supply system coupled to said aircraft, said air supply system comprising:
an air supply device coupled to said fuselage and configured to supply outside air to said fuselage;
a supply duct coupled in flow communication to said air supply device and extending through said cargo area and into said floor distribution section; and
an air supply outlet coupled in flow communication to said supply duct and in flow communication with said occupancy zone via said floor distribution section, said air supply outlet defined in said upper floor for channeling a flow of outside air supplied by said air supply device into said occupancy zone such that the locations where passengers are seated receive only the flow of outside air; and
an air recirculation system coupled to said aircraft, said air recirculation system comprising:
a recirculation supply device positioned in said cargo area, said recirculation supply device configured to supply recirculated air to said passenger area;
a recirculation duct coupled in flow communication to said recirculated supply device and extending from said cargo area into said floor distribution section; and
a recirculation outlet coupled in flow communication to said recirculation duct and in flow communication with said recirculation zone via said floor distribution section, said recirculation outlet defined in said upper floor for channeling a flow of recirculated air supplied by said recirculation supply device into said recirculation zone such that the flow of recirculated air is channeled into said passenger area only at locations where passengers are not seated.

2. The aircraft of claim 1 wherein said air supply system and said air recirculation system are coupled in flow communication to the floor distribution section.

3. The aircraft of claim 2 further comprising a mixer coupled to the floor distribution section.

4. The aircraft of claim 1 further comprising a mixing plenum coupled to the floor distribution section, said mixing plenum is configured to mix external air mass from said air supply system with recirculated air mass from said air recirculation system.

5. The aircraft of claim 4 further comprising a mixer coupled to said mixing plenum.

6. The aircraft of claim 4 wherein said supply duct and said recirculation duct are coupled in flow communication to said mixing plenum.

7. The aircraft of claim 4 further comprising a plurality of ducts coupled in flow communication to said mixing plenum and to said occupancy zone, said plurality of ducts configured to channel a mixed air mass into said occupancy zone.

8. The aircraft of claim 7 further comprising a flow control device coupled to at least one duct of said plurality of ducts.

9. The aircraft of claim 1 further comprising an auxiliary duct coupled in flow communication to said recirculation duct and comprising a flow control device coupled in flow communication to said auxiliary duct.

10. The aircraft of claim 1 further comprising a cargo zone, an exhaust zone and an airflow device coupled in flow communication to said cargo zone and said exhaust zone.

11. An environmental control system for use with an aircraft having a floor distribution section that is coupled in flow communication to an occupancy zone including locations where passengers are seated and a recirculation zone adjacent to the occupancy zone and including locations where passengers are not seated and does not overlap with the occupancy zone, the floor distribution section defined between an upper floor and a lower floor of the aircraft, wherein the upper floor at least partially defines a passenger area in the aircraft and the lower floor at least partially defines a cargo area, said environmental control system comprising:
an air supply system coupled to the aircraft, the air supply system comprising:
an air supply device coupled to and configured to supply outside air to the aircraft;
a supply duct coupled in flow communication to said air supply device and extending through said cargo area and into the floor distribution section; and
an air supply outlet coupled in flow communication to said supply duct and in flow communication with the occupancy zone via the floor distribution section, said air supply outlet defined in said upper floor for channeling a flow of outside air supplied by said air supply device into said occupancy zone such that the locations where passengers are seated receive only the flow of outside air; and
an air recirculation system coupled to the aircraft, the air recirculation system comprising:
a recirculation supply device positioned in said cargo area, said recirculation supply device configured to receive exhaust air exhausted from said passenger area through an upper portion of said aircraft and supply recirculated air to said passenger area;
a recirculation duct coupled in flow communication to said recirculated supply device and extending from said cargo area into said floor distribution section; and
a recirculation outlet coupled in flow communication to said recirculation duct and in flow communication with the recirculation zone via the floor distribution section, said recirculation outlet defined in said upper floor for channeling a flow of recirculated air supplied by said recirculation supply device into said recirculation zone such that the flow of recirculated air is channeled into said passenger area only at locations where passengers are not seated.

12. The environmental control system of claim 11 further comprising a heat exchanger coupled to said recirculation duct.

13. The environmental control system of claim 11 further comprising a controller operatively coupled to said air supply system and said air recirculation system.

14. The environmental control system of claim 11 wherein said air supply outlet is coupled in flow communication to the occupancy zone and said recirculation outlet is coupled in flow communication with the recirculation zone.

15. The environmental control system of claim 11 wherein said air supply system and said recirculation system are coupled in flow communication to the floor distribution section.

16. The environmental control system of claim 11 further comprising a mixing plenum coupled to the floor distribution section, said mixing plenum is configured to mix external air mass from said air supply system with recirculated air mass from said air recirculation system.

17. The environmental control system of claim 11 further comprising a plurality of ducts coupled in flow communication to said mixing plenum and to said occupancy zone, said plurality of ducts configured to channel a mixed air mass into said occupancy zone.

18. A method of controlling airflow within an aircraft having a floor distribution section that is coupled in fluid communication to an occupancy zone including locations where passengers are seated, a recirculation zone adjacent to said occupancy zone and including locations where passengers are not seated and does not overlap with the occupancy zone, and a mixing zone above the occupancy zone and the recirculation zone, and that is defined between an upper floor and a lower floor of the aircraft, the floor distribution section having a supply duct and a recirculation duct extending therethrough, wherein the upper floor at least partially defines a passenger area in the aircraft and the lower floor at least partially defines a cargo area, the method comprising:
   directing outside air into an air supply system using an air supply device;
   directing recirculated air into an air recirculation system using an recirculation supply device;
   channeling the outside air into the occupancy zone through air supply outlets defined in the upper floor such that the locations where passengers are seated receive only the flow of outside air;
   channeling the recirculated air into the recirculation zone through recirculation outlets defined in the upper floor such that the flow of recirculated air is channeled into the passenger area only at locations where passengers are not seated;
   mixing, in the mixing zone, the external air flowing out of the occupancy zone and the recirculated air flowing out of the recirculation zone to facilitate forming a mixed air; and
   channeling the mixed air into the air recirculation system via an exhaust zone.

19. The method of claim 18 further comprising directing the external air and the recirculated air into the floor distribution section.

20. The method of claim 19 further comprising mixing the external air and the recirculated air in the floor distribution section.

21. The method of claim 18 further comprising directing the external air and the recirculated air into a mixing plenum that is located in the floor distribution section and mixing the external air and the recirculated air within the mixing plenum.

22. The method of claim 18 further comprising channeling the recirculated air into an auxiliary duct.

23. The aircraft of claim 1 further comprising:
   an array of air supply outlets defined at different positions along said upper floor; and
   an array of recirculation outlets defined at different positions along said upper floor.

24. The aircraft of claim 23, wherein:
   said array of air supply outlets is arranged such that the air is discharged underneath passenger seats in the occupancy zone, and
   said array of recirculation outlets is arranged such that the flow of recirculated air is discharged into an aisle of the passenger area in the recirculation zone.

* * * * *